( 12 ) United States Patent
Kitada et al.

(10) Patent No.: US 10,012,822 B2
(45) Date of Patent: Jul. 3, 2018

(54) ZOOM LENS SYSTEM, INTERCHANGEABLE LENS DEVICE AND CAMERA SYSTEM WITH ZOOM LENS SYSTEM, AND IMAGING APPARATUS WITH ZOOM LENS SYSTEM

(71) Applicant: Panasonic Intellectual Property Management Co., Ltd., Osaka (JP)

(72) Inventors: Takahiro Kitada, Osaka (JP); Shunichiro Yoshinaga, Osaka (JP); Takakazu Bito, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/419,143

(22) Filed: Jan. 30, 2017

(65) Prior Publication Data

US 2017/0242227 A1 Aug. 24, 2017

(30) Foreign Application Priority Data

Feb. 18, 2016 (JP) .................................. 2016-028466
Jan. 13, 2017 (JP) .................................. 2017-003805

(51) Int. Cl.
*G02B 27/64* (2006.01)
*G02B 15/14* (2006.01)
(Continued)

(52) U.S. Cl.
CPC ........... *G02B 15/163* (2013.01); *G02B 15/20* (2013.01); *G02B 15/22* (2013.01); *G02B 27/646* (2013.01)

(58) Field of Classification Search
CPC ........ G02B 15/00; G02B 15/14; G02B 15/16; G02B 15/163; G02B 15/20; G02B 27/64; G02B 27/646; G02B 15/22
See application file for complete search history.

(56) References Cited

U.S. PATENT DOCUMENTS

2009/0161227 A1* 6/2009 Yamamoto ........... G02B 15/173
359/683
2011/0013288 A1* 1/2011 Ohata .................... G02B 13/18
359/689

(Continued)

FOREIGN PATENT DOCUMENTS

WO 2011/099250 8/2011
WO 2012/086153 6/2012

*Primary Examiner* — Thong Nguyen
(74) *Attorney, Agent, or Firm* — Wenderoth, Lind & Ponack, L.L.P.

(57) ABSTRACT

The zoom lens system includes a first lens group with positive power, a second lens group with negative power, a third lens group with positive power, a fourth lens group with negative power, and a fifth lens group with positive power. An aperture stop is provided between the second and the third lens groups. The third lens group includes lens element L3$a$ and L3$b$ with positive power, lens element L3$c$ with negative power, and lens element L3$d$ with positive power. The lens elements L3$c$ and L3$d$ are cemented. The lens element L3$b$ corrects image blurring. The fourth lens group moves when focusing. When zooming, the first to the fourth lens group move.
Here, condition (1) below is satisfied.

$$0.24 < fL3b/fG3 < 3.0 \qquad (1)$$

Where
fL3$b$ is a focal length of the lens element L3$b$, and fG3 is a focal length of the third lens group.

11 Claims, 13 Drawing Sheets

(51) Int. Cl.
   *G02B 15/163*  (2006.01)
   *G02B 15/20*  (2006.01)
   *G02B 15/22*  (2006.01)

(56) References Cited

U.S. PATENT DOCUMENTS

| | | | | |
|---|---|---|---|---|
| 2011/0141577 A1* | 6/2011 | Kimura | ............... | G02B 15/173 |
| | | | | 359/683 |
| 2012/0013995 A1* | 1/2012 | Saruwatari | ........... | G02B 15/173 |
| | | | | 359/687 |
| 2012/0050882 A1* | 3/2012 | Arai | ..................... | G02B 15/177 |
| | | | | 359/680 |
| 2012/0087016 A1* | 4/2012 | Ito | ........................ | G02B 15/173 |
| | | | | 359/684 |
| 2012/0154525 A1 | 6/2012 | Yoshinaga et al. | | |
| 2012/0327272 A1* | 12/2012 | Bito | ..................... | G02B 15/173 |
| | | | | 348/240.1 |
| 2013/0141616 A1 | 6/2013 | Imaoka | | |
| 2013/0162884 A1* | 6/2013 | Tashiro | ................. | G02B 15/14 |
| | | | | 348/345 |
| 2013/0308041 A1* | 11/2013 | Hatada | ................... | G02B 15/10 |
| | | | | 348/360 |
| 2014/0043692 A1* | 2/2014 | Mogi | ..................... | G02B 15/14 |
| | | | | 359/683 |
| 2014/0198231 A1* | 7/2014 | Itoh | ...................... | H04N 5/3572 |
| | | | | 348/222.1 |
| 2017/0123193 A1* | 5/2017 | Yanai | .................. | G02B 15/173 |

\* cited by examiner

ZOOM LENS SYSTEM, INTERCHANGEABLE LENS DEVICE AND CAMERA SYSTEM WITH ZOOM LENS SYSTEM, AND IMAGING APPARATUS WITH ZOOM LENS SYSTEM

BACKGROUND

1. Technical Field

The present disclosure relates to zoom lens systems, interchangeable lens devices, camera systems, and imaging apparatuses.

2. Description of the Related Art

A lens interchangeable digital camera system (hereinafter simply referred to as "camera system") can capture high picture-quality images with high sensitivity. It has advantages, such as high-speed focusing and image processing after capturing, and easy replacement of interchangeable lens device according to a scene to be captured. These advantages have rapidly spread the use of the camera system. Moreover, an interchangeable lens device with zoom lens system that enables variable magnification of optical images can freely change the focal length without replacing the lens.

High optical performance from a wide-angle end to telephoto end has been demanded for a zoom lens system used in interchangeable lens devices, and zoom lens systems configured with multiple groups that have image blur correcting function have been proposed.

For example, PTL1 discloses a zoom lens system that includes, in order from an object side to an image side, a first lens group with positive optical power, a second lens group with negative optical power, a third lens group with negative optical power, a fourth lens group with positive optical power including at least one resin lens, and an aperture stop disposed inside the fourth lens group. When zooming from the wide-angle end to the telephoto end, a distance between the third lens group and the fourth lens group monotonously decreases, and a ratio of a thickness of the fourth lens group in an optical-axis direction to a focal length of the entire system at the wide-angle end is set to a given range.

PTL2 discloses a zoom lens system that includes, in order from the object side to the image side, a first lens group with negative optical power, a second lens group with positive optical power, a third lens group with negative optical power, and a fourth lens group with positive optical power. The second lens group includes, in order from the object side to the image side, a object-side second lens group and an image-side second lens group. The image-side second lens group moves in a direction perpendicular to the optical axis so as to optically correct image blurring. A ratio of a synthesized focal length of the image-side second lens group to a focal length of the entire system at the wide-angle end is set to a given range.

CITATION LIST

Patent Literature

PTL1 International Publication No. 2011/099250
PTL2 International Publication No. 2012/086153

SUMMARY

The present disclosure offers a small and light zoom lens system, an interchangeable lens device and camera system including the zoom lens system, and an imaging apparatus including the zoom lens system.

The zoom lens system in the present disclosure includes, in order from an object side to an image side, a first lens group with positive optical power, a second lens group with negative optical power, a third lens group with positive optical power, a fourth lens group with negative optical power, and a fifth lens group with positive optical power. An aperture stop is provided between the second lens group and the third lens group.

The third lens group includes at least, in order from the object side to the image side, lens element L3$a$ with positive optical power, lens element L3$b$ with positive optical power, lens element L3$c$ with negative optical power, and lens element L3$d$ with positive optical power.

Respective optical surfaces of the lens element L3$c$ and the lens element L3$d$ are mutually cemented.

The lens element L3$b$ optically corrects image blurring by moving in a way so as to have a component perpendicular to an optical axis.

The fourth lens group moves along the optical axis when focusing from an infinity focusing state to a proximity focusing state.

When zooming from a wide-angle end to a telephoto end, at least the first lens group, the second lens group, the third lens group, and the fourth lens group move in a direction of the optical-axis.

Here, condition (1) below is satisfied.

$$0.24 < fL3b/fG3 < 3.0 \tag{1}$$

Where
fL3$b$ is focal length of the lens element L3$b$, and fG3 is a focal length of the third lens group.

The interchangeable lens device in the present disclosure is detachable, via a camera mount of a camera body, from the camera body having an imaging element for receiving an optical image and converting it to an electric image signal. The interchangeable lens device includes a zoom lens system for forming an optical image of an object in an imaging element, and a lens mount electrically and/or mechanically connected to the camera mount.

The camera system of the present disclosure includes the interchangeable lens device including the zoom lens system, and the camera body detachably connected to the interchangeable lens device via the camera mount. The camera body includes the imaging element for receiving an optical image of an object formed by the zoom lens system and converting the optical image to an electric image signal.

The imaging apparatus of the present disclosure converts an optical image of an object to an electric image signal, and at least displays or stores a converted image signal. The imaging apparatus includes the zoom lens system for forming the optical image of the object, and the imaging element for converting the optical image formed by the zoom lens system to an electric image signal.

The present disclosure can offer a small and light zoom lens system that also have an image blur correcting function in which distortion of optical images due to image blur correction is satisfactorily corrected, and an interchangeable lens device and camera system including the zoom lens system.

DETAILED DESCRIPTION

Hereinafter, a detailed description is made of some embodiments with reference to the related drawings as appropriate. However, a detailed description more than necessary may be omitted, such as a description of a well-known item and a duplicate description for a substantially identical component, to avoid an unnecessarily redundant description and to allow those skilled in the art to easily understand the following description.

Note that accompanying drawings and the following description are provided for those skilled in the art to well understand the present disclosure and does not intend to limit the subjects described in the claims by the drawings and the description.

In the present disclosure, a lens group is a group configured at least with one lens element. Optical power, synthesized focal length, and so on are determined based on a type, number, and layout of the lens element configuring each lens group.

First Through Third Exemplary Embodiments

Figure 1:
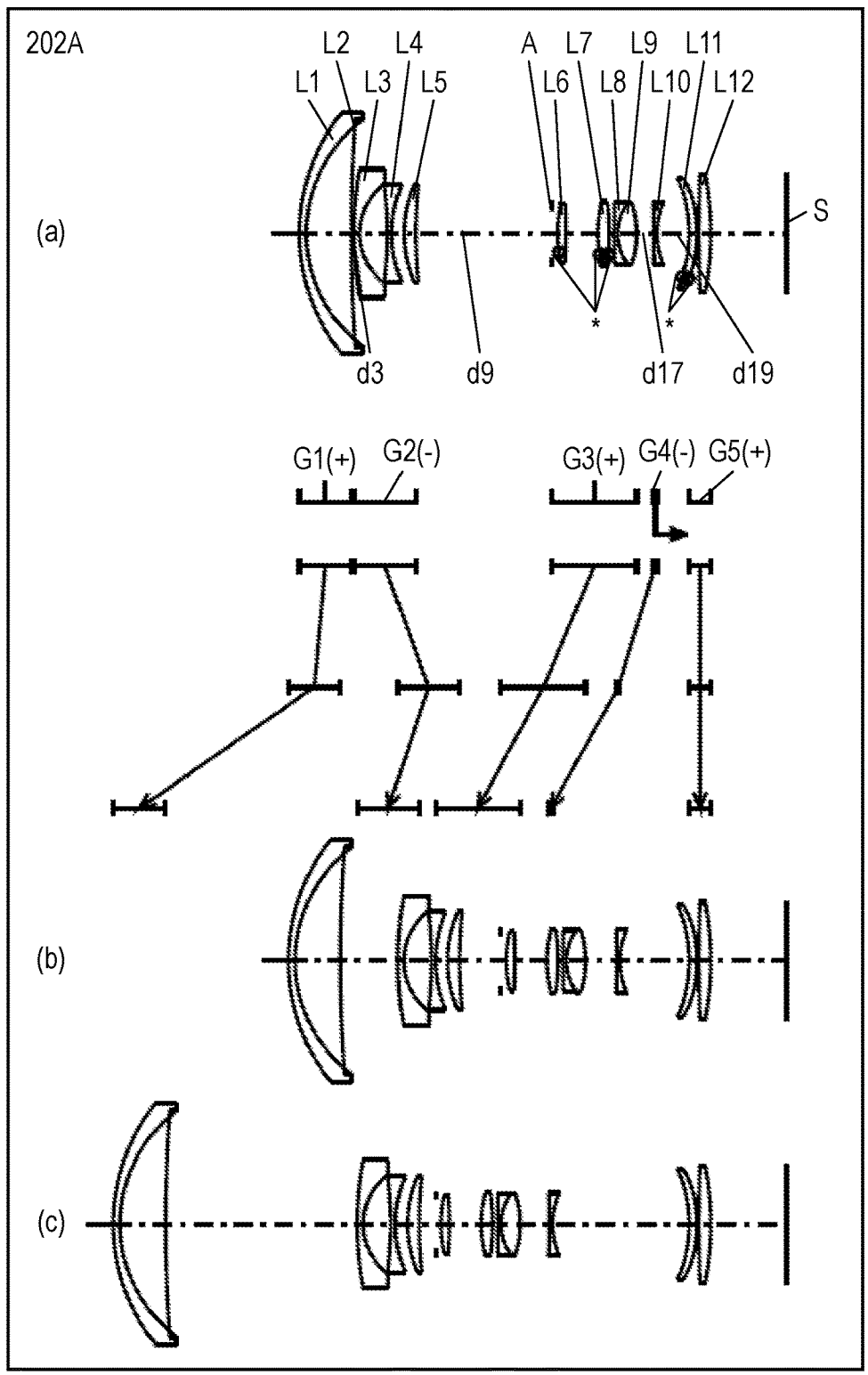
FIG. 1 is a lens layout diagram of a zoom lens system showing an infinity focusing state in accordance with a first exemplary embodiment (numerical practical example 1).
Figure 5:
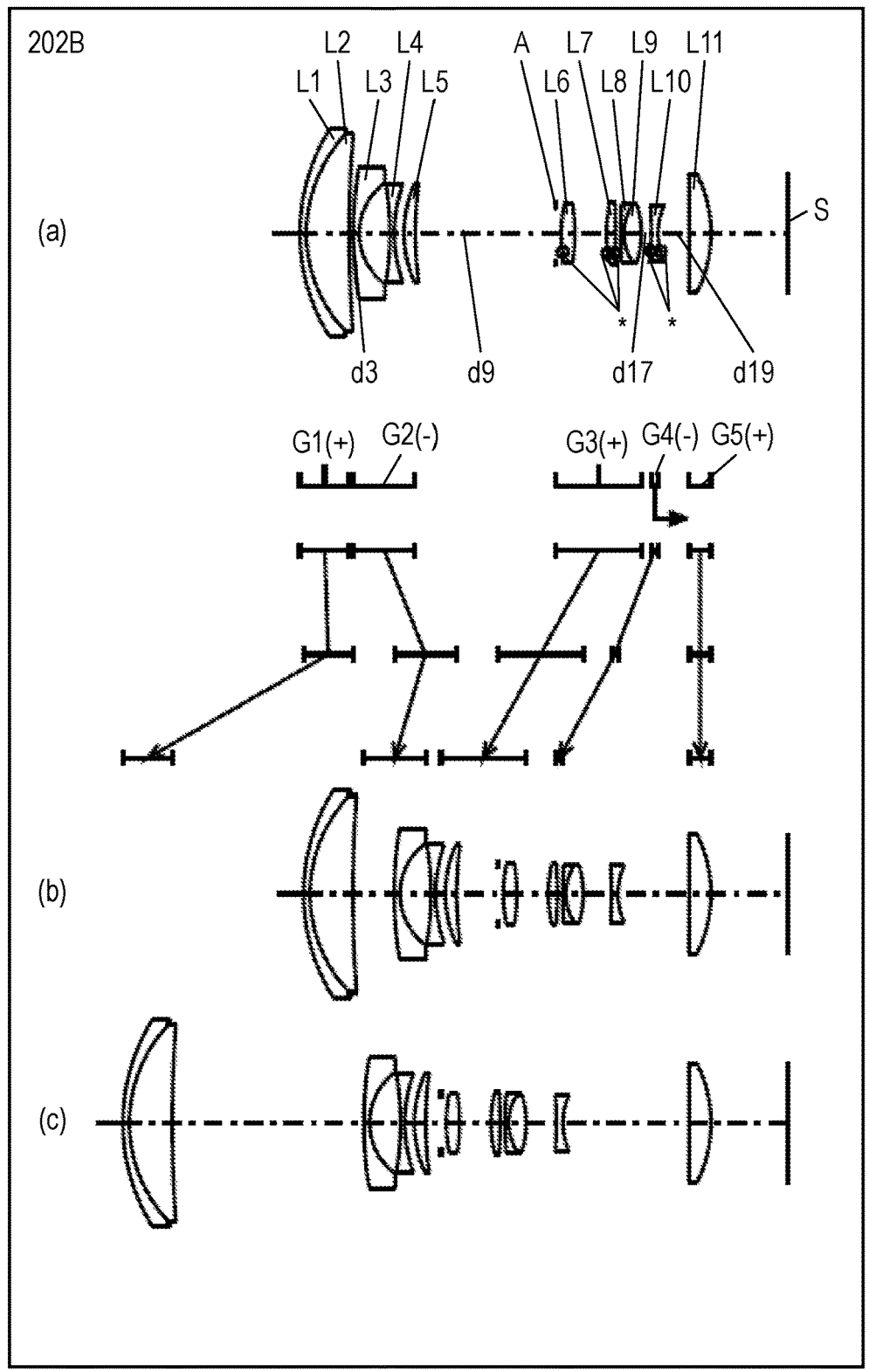
FIG. 5 is a lens layout diagram of a zoom lens system showing an infinity focusing state in accordance with a second exemplary embodiment (numerical practical example 2).
Figure 9:
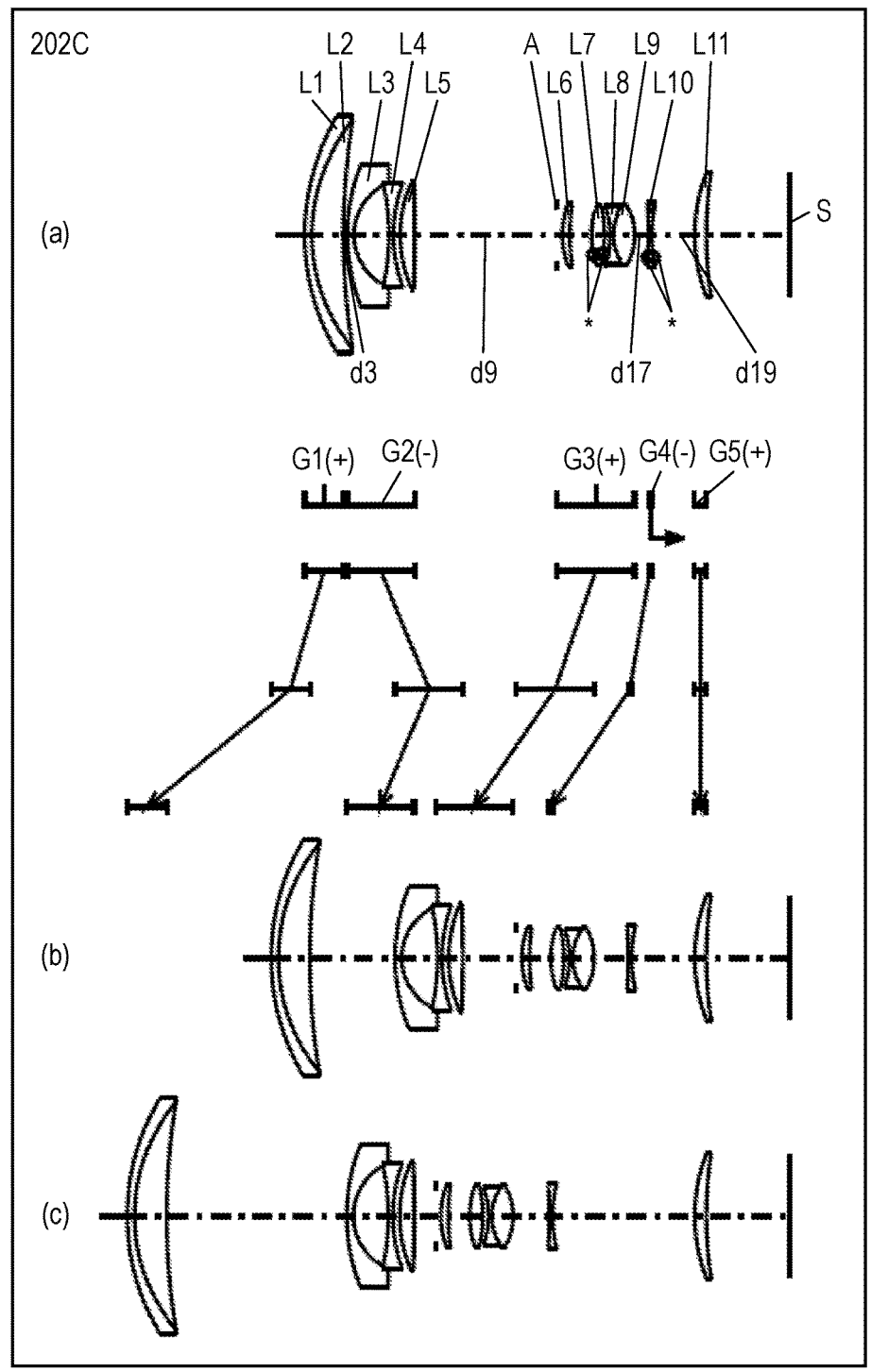
FIG. 9 a lens layout diagram of a zoom lens system showing an infinity focusing state in accordance with a third exemplary embodiment (numerical practical example 3).

FIGS. 1, 5, and 9 are lens layout diagrams of zoom lens systems 202A to 202C in the first to third exemplary embodiments, respectively. Each figure shows the zoom lens system in the infinity focusing state. Zoom lens systems 202A to 202C may be collectively called zoom lens system 202.

In FIGS. 1, 5, and 9, part (a) shows a lens configuration of the wide-angle end (a state of the shortest focal length: Focal length fW), part (b) shows a lens configuration of the intermediate position (a state of the intermediate focal length: Focal length $fM=(fW*fT)^{1/2}$, and part (c) shows a lens configuration of the telephoto end (a state of the longest focal length: Focal length fT).

In addition, in FIGS. 1, 5, and 9, zigzag arrows from parts (a) to (c) are straight lines connecting the positions of the lens groups in each state of the wide-angle end, intermediate position, and telephoto end, in sequence from the top. Parts between the wide-angle end and the intermediate position, and between the intermediate position and the telephoto end are simply connected by straight lines, which is different from actual movement of each lens group.

Furthermore, in FIGS. 1, 5, and 9, arrows on the lens groups indicate directions of movement of the lens groups when focusing from an infinity focusing state to a proximity focusing state. In other words, FIGS. 1, 5, and 9 show that the lens groups move toward an object side when fourth lens group G4 focuses from the infinity focusing state to the proximity focusing state, which is described later.

In FIGS. 1, 5, and 9, asterisk (*) inscribed in part (a) of FIGS. 1, 5, and 9 on a specific surface represents that the surface is aspheric. Still more, symbol (+) and symbol (−) affixed to each mark of the lens groups in FIGS. 1, 5, and 9 correspond to a mark of the optical power of each lens group. The straight line at the rightmost in part (a) of FIGS. 1, 5, and 9 indicates the position of image surface (imaging element) S.

Zoom lens system 202 in the first to third exemplary embodiments include, in order from the object side to the image side, first lens group G1 with positive optical power, second lens group G2 with negative optical power, third lens group G3 with positive optical power, fourth lens group G4 with negative optical power, and fifth lens group G5 with positive optical power.

In zoom lens system 202 in each exemplary embodiment, a distance between lens groups changes when zooming. More specifically, first lens group G1, second lens group G2, third lens group G3, and fourth lens group G4 move along the optical axis so that all of distance d3 between first lens group G1 and second lens group G2, distance d9 between second lens group G2 and third lens group G3, distance d17 between third lens group G3 and fourth lens group G4, and distance d19 between fourth lens group G4 and fifth lens group G5 change.

In addition, in zoom lens system 202 in the first to third exemplary embodiments, seventh lens element L7 (an example of lens element L3b) moves in a direction perpendicular to the optical axis in order to optically correct image blurring, as shown in FIGS. 1, 5, and 9.

Furthermore, in zoom lens system 202 in the first to third exemplary embodiments, first lens group G1 includes, in order from the object side to the image side, first lens element L1 having a negative meniscus shape with a convex surface facing an object and second lens element L2 having a positive meniscus shape with a convex surface facing an object. Optical surfaces of first lens element L1 and second lens element L2 are mutually cemented typically with adhesive agent.

Each exemplary embodiment is detailed below.

First Exemplary Embodiment

FIG. 1 is zoom lens system 202A in the first exemplary embodiment.

Second lens group G2 of zoom lens system 202A includes, in order from the object side to the image side, third lens element L3 having a negative meniscus shape with a convex surface facing an object, fourth lens element L4 with a biconcave shape and negative optical power, and fifth lens element L5 having a positive meniscus shape with a concave surface facing an object.

Third lens group G3 of zoom lens system 202A includes, in order from the object side to the image side, sixth lens element L6 (an example of lens element L3a) with a biconvex shape and positive optical power, seventh lens element L7 (an example of lens element L3b) with a biconvex shape and positive optical power, eighth lens element L8 (an example of lens element L3c) having a negative meniscus shape with a convex surface facing an object, and ninth lens element L9 (an example of lens element L3d) with a biconvex shape and positive optical power. Optical surfaces of eighth lens element L8 and ninth lens element L9 are mutually cemented typically with adhesive agent. A surface facing an object of sixth lens element L6 is aspheric. Both surfaces of seventh lens element L7 are aspheric. Aperture stop A is disposed on third lens group G3 to the side closest to the object, and moves integrally with third lens group G3.

Fourth lens group G4 of zoom lens system 202A includes tenth lens element L10 with a biconcave shape and negative optical power.

Fifth lens group G5 of zoom lens system 202A includes, in order from the object side to the image side, eleventh lens element L11 having a positive meniscus shape with a concave shape facing an object, and twelfth lens element L12 with a biconvex shape and positive optical power. Both surfaces of eleventh lens element L11 are aspheric.

In zoom lens system 202, when zooming from the wide-angle end to the telephoto end on photographing, first lens group G1 moves to the object side, second lens group G2 moves making a convex trace to the image side, third lens group G3 moves to the object side, fourth lens group G4 moves to the object side, and fifth lens group G5 is fixed relative to image surface S.

In other words, when zooming, each of first lens group G1, second lens group G2, third lens group G3, and fourth lens group G4 moves along the optical axis so that distance d3 between first lens group G1 and second lens group G2 increases, distance d9 between second lens group G2 and third lens group G3 decreases, distance d17 between third lens group G3 and fourth lens group G4 changes, and distance d19 between fourth lens group G4 and fifth lens group G5 increases.

Second Exemplary Embodiment

FIG. 5 is zoom lens system 202B in the second exemplary embodiment.

Second lens group G of zoom lens system 202B includes, in order from the object side to the image side, third lens element L3 having a negative meniscus shape with a convex surface facing an object, fourth lens element L4 with biconcave shape and negative optical power, and fifth lens element L5 having a positive meniscus shape with a convex surface facing an object.

Third lens group G3 of zoom lens system 202B includes, in order from the object side to the image side, sixth lens element L6 (an example of lens element L3a) with biconvex shape and positive optical power, seventh lens element L7 (an example of lens element L3b) with biconvex shape and positive optical power, eighth lens element L8 (an example of lens element L3c) having a negative meniscus shape with a convex surface facing an object, and ninth lens element L9 (an example of lens element L3d) with biconvex shape and positive optical power. Optical surfaces of eighth lens element L8 and ninth lens element L9 are mutually cemented typically with adhesive agent. A surface facing an object of sixth lens element L6 is aspheric. Both surfaces of seventh lens element L7 are aspheric. Aperture stop A is disposed on third lens group G3 to the side closest to the object, and moves integrally with third lens group G3.

Fourth lens group G4 of zoom lens system 202B includes tenth lens element L10 with biconcave shape and negative optical power. Both surfaces of tenth lens element 10 are aspheric.

Fifth lens group G5 of zoom lens system 202B includes eleventh lens element L11 having a positive meniscus shape with a concave surface facing an object.

In zoom lens system 202B, when zooming from the wide-angle end to telephoto end on photographing, first lens group G1 moves making a convex trace to the image side, second lens group G2 moves making a convex trace to the image side, third lens group G3 moves to the object side, fourth lens group G4 moves to the object side, and fifth lens group G5 is fixed relative to image surface S.

In other words, when zooming, each of first lens group G1, second lens group G2, third lens group G3, and fourth lens group G4 moves along the optical axis so that distance d3 between first lens group G1 and second lens group G2 increases, distance d9 between second lens group G2 and third lens group G3 decreases, distance d17 between third lens group G3 and fourth lens group G4 changes, and distance d19 between fourth lens group G4 and fifth lens group G5 increases.

Third Exemplary Embodiment

FIG. 9 is zoom lens system 202C in the third exemplary embodiment.

Second lens group G2 of zoom lens system 202C includes, in order from the object side to the image side, third lens element L3 having a negative meniscus shape with a convex surface facing an object, fourth lens element L4 with biconcave shape and negative optical power, and fifth lens element L5 with biconvex shape and positive optical power.

Third lens group G3 of zoom lens system 202C includes sixth lens element L6 (an example of lens element L3a) having a positive meniscus shape with a convex surface facing an object, seventh lens element L7 (an example of lens element L3b) with biconvex shape and positive optical power, eighth lens element L8 (an example of lens element L3c) with biconvex shape and negative optical power, and ninth lens element L9 (an example of lens element L3d) with biconvex shape and positive optical power. Eight lens element L8 and ninth lens element L9 are cemented. Both surfaces of seventh lens element L7 are aspheric. Aperture stop A is disposed on third lens group G3 to the side closest to the object, and moves integrally with third lens group G3.

Fourth lens group G4 of zoom lens system 202C includes tenth lens element L10 with biconcave shape and negative optical power. Both surfaces of tenth lens element L10 are aspheric.

Fifth lens group G5 of zoom lens system 202C includes eleventh lens element L11 having a positive meniscus shape with a convex surface facing an object.

In zoom lens system 202C, when zooming from the wide-angle end to the telephoto end on photographing, first lens group G1 moves to the object side, second lens group G2 moves making a convex trace to the image side, third lens group G3 moves to the object side, fourth lens group G4 moves to the object side, and fifth lens group G5 is fixed related to image surface S.

In other words, when zooming, each of first lens group G1, second lens group G2, third lens group G3, and fourth lens group G4 moves along the optical axis so that distance d3 between first lens group G1 and second lens group G2 increases, distance d9 between second lens group G2 and third lens group G3 decreases, distance d17 between third lens group G3 and fourth lens group G4 changes, and distance d19 between fourth lens group G4 and fifth lens group G5 increases.

Conditions and Advantages

Hereinafter, conditions that a zoom lens system, such as zoom lens system 202 in the first to third exemplary embodiments, preferably satisfies are described. Multiple preferable conditions are specified for the zoom lens system of each exemplary embodiment. A configuration of zoom lens system that satisfies all these multiple conditions is most preferable. However, by satisfying an individual condition, a zoom lens system that provides a corresponding advantage may be achieved.

The zoom lens system includes, in order from the object side to the image side, first lens group G1 with positive optical power, second lens group G2 with negative optical power, third lens group G3 with positive optical power, fourth lens group G4 with negative optical power, and fifth lens group G5 with positive optical power.

Aperture stop A is provided between second lens group G2 and third lens group G3.

Third lens group G3 includes, in order from the object side to the image side, at least lens element L3$a$ with positive optical power, lens element L3$b$ with positive optical power, lens element L3$c$ with negative optical power, and lens element L3$d$ with positive optical power.

Respective optical surfaces of lens element L3$c$ and lens element L3$d$ are cemented to each other.

Lens element L3$b$ optically corrects image blurring by moving in a way so as to have a component perpendicular to the optical axis.

When focusing from an infinity focusing state to a proximity focusing state, fourth lens group G4 moves along the optical axis.

When zooming from the wide-angle end to the telephoto end on photographing, at least first lens group G1, second lens group G2, third lens group G3, and fourth lens group G4 move in a direction of the optical axis. Here, condition (1) below is satisfied.

$$0.24 < fL3b/fG3 < 3.0 \quad (1)$$

Where
fL3$b$: Focal length of lens element L3$b$
fG3: Focal length of third lens group G3

Condition (1) is a condition for specifying a relationship between the focal length of lens element L3$b$ that optically corrects image blurring and third lens group G3. When a value is below the lower limit of condition (1), both eccentric coma aberration and eccentric astigmatism occur at correcting image blurring. In addition, distortion greatly fluctuates in line with image blur correction. Conversely, when a value is above the upper limit of condition (1), lens element L3$b$ moves too much, and an actuator for moving lens element L3$b$ needs also to be enlarged. As a result, a zoom lens and a lens barrel for holding it also become large. Downsizing thus cannot be achieved.

The above advantage can be further enhanced by further satisfying at least one of conditions (1a) and (1b) below.

$$0.30 < fL3b/fG3 < 3.0 \quad (1a)$$

$$0.24 < fL3b/fG3 < 1.5 \quad (1b)$$

The above advantage can be still further enhanced by further satisfying at least one of conditions (1c) and (1d) below.

$$0.35 < fL3b/fG3 < 3.0 \quad (1c)$$

$$0.24 < fL3b/fG3 < 1.2 \quad (1d)$$

In the zoom lens system, for example, fifth lens group G5 disposed to the side closest to the image is preferably fixed relative to the image surface when zooming from the wide-angle end to the telephoto end on photographing.

This has a benefit of fully preventing an entry of dust inside the zoom lens system. In addition, since the number of cam structures can be reduced, a configuration of the lens barrel can be simplified.

Still more, for example, the zoom lens system preferably satisfies condition (2) below.

$$0.20 < D3Gmax/T3G < 0.8 \quad (2)$$

Where
D3G max: Largest air space inside third lens group G3
T3G: Thickness of third lens group G3 on the optical axis Condition (2) is a condition for specifying a relationship between the largest air space of air space inside third lens group G3 and a thickness of third lens group G3 on the optical axis. When a value is below the lower limit of condition (2), the thickness of third lens group G3 on the optical axis increases, and the zoom lens system and the lens barrel holding it also become large. Downsizing is thus not achieved. Conversely, when a value is above the upper limit of condition (2), a percentage of air relative to the thickness of third lens group G3 on the optical axis becomes too large, and arrangement of a lens element required for correcting aberration becomes difficult.

The above advantage can be further enhanced by further satisfying at least one of (2a) and (2b) below.

$$0.23 < D3Gmax/T3G < 0.8 \quad (2a)$$

$$0.20 < D3Gmax/T3G < 0.6 \quad (2b)$$

Still more, the above advantage can be still further enhanced by further satisfying one of (2c) and (2d) below.

$$0.25 < D3Gmax/T3G < 0.8 \quad (2c)$$

$$0.20 < D3Gmax/T3G < 0.5 \quad (2d)$$

Furthermore, in zoom lens system 202, for example, first lens group G1 is preferably configured with two lens elements.

This enables to favorably correct various aberrations, including astigmatism at the wide-angle end and coma aberration at the telephoto, while keeping a thickness of first lens group G1 on the optical axis thin.

In addition, in zoom lens system 202, for example, second lens group G2 is preferably configured with three lens elements.

This enables to favorably correct various aberrations, including astigmatism at the wide-angle end, spherical aberration at the telephoto, and coma aberration, while keeping a thickness of second lens group G2 on the optical axis thin.

Still more, in zoom lens system 202, for example, fourth lens group G4 is preferably configured with one lens element.

This enables to make fourth lens group light to facilitate high-speed focusing when focusing from the infinity focusing state to the proximity focusing state. A thickness of fourth lens group G4 on the optical axis can also be reduced, and thus the zoom lens system can be downsized.

Still more, in zoom lens system 202, for example, lens element L3b is preferably a resin lens.

This can reduce the weight of the lens element for correcting image blurring, and thus an actuator for moving lens element L3b at correcting image blurring can be simplified and downsized.

Still more, in zoom lens system 202, for example, at least one lens element of fourth lens group G4 is preferably configured with a resin lens.

This enables to reduce the weight of the lens group that executes focusing, and thus facilitates high-focusing.

Still more, in zoom lens system 202, for example, aperture stop A and third lens group G3 preferably move integrally when zooming from the wide-angle end to the telephoto end.

This enables to reduce cam structures, and thus a configuration of the lens barrel can be simplified.

Fourth Exemplary Embodiment

Figure 13:
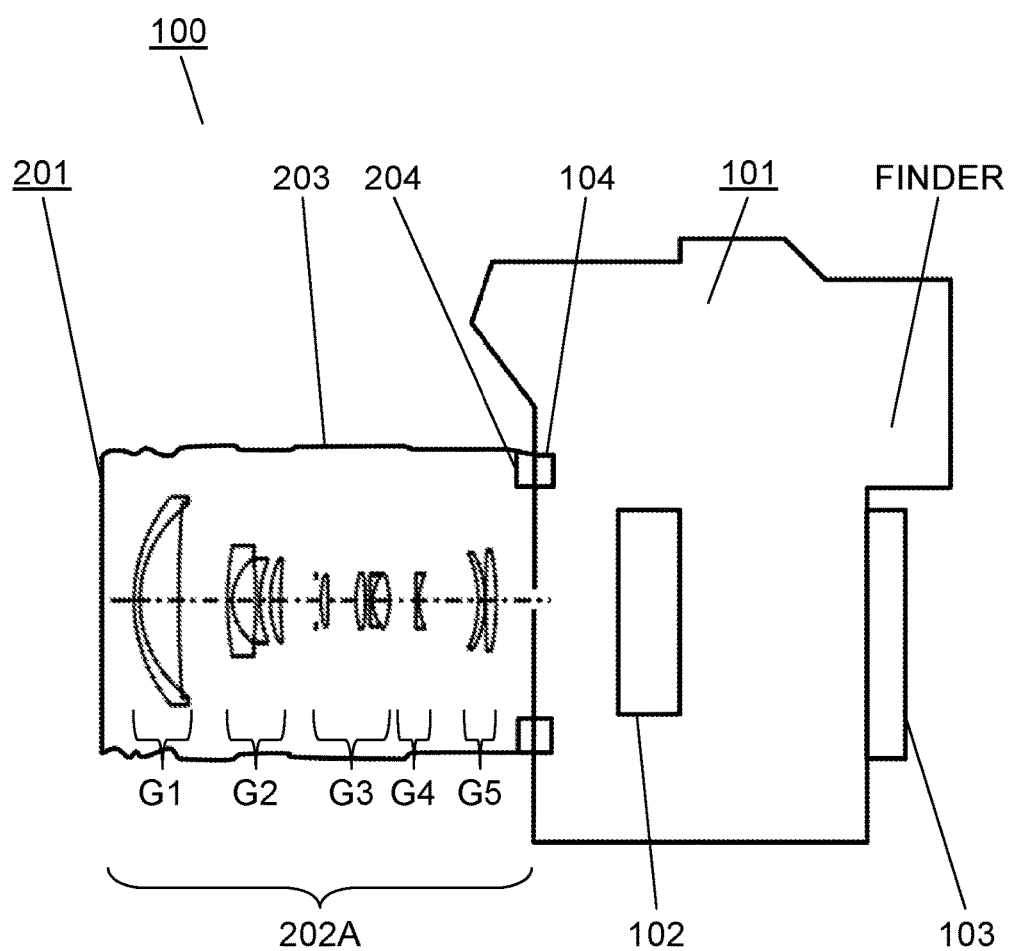
FIG. 13 is an outline block diagram of a lens interchangeable digital camera system in accordance with a fourth exemplary embodiment.

FIG. 13 is a schematic diagram of a lens interchangeable digital camera system in the fourth exemplary embodiment.

Lens interchangeable digital camera system 100 in the fourth exemplary embodiment includes camera body 101, and interchangeable lens device 201 detachably connected to camera body 101.

Camera body 101 includes imaging element 102 for receiving an optical image formed by zoom lens system 202 of interchangeable lens device 201 and converting it to an electric image signal, monitor 103 for displaying the image signal converted by imaging element 102, and camera mount 104.

Interchangeable lens device 201 includes zoom lens system 202 in one of the first to third exemplary embodiments, lens barrel 203 holding zoom lens system 202, and lens mount 204 connected to camera mount 104 of camera body 101. With respect to camera mount 104 and lens mount 204, a controller (not illustrated) inside camera body 101 and a controller (not illustrated) inside interchangeable lens device 201 are electrically connected, in addition to physical connection, so as to function as an interface that allows mutual signal communication. FIG. 13 illustrates the case of using zoom lens system 202A in the first exemplary embodiment as zoom lens system 202.

Zoom lens system 202 includes zoom lenses (first lens group G1, second lens group G2, third lens group G3, fourth lens group G4, and fifth lens group G5) held by a lens frame inside lens barrel 203.

The zoom lenses are held by the lens frame in lens barrel 203.

When zooming, a controller in interchangeable lens device 201 controls an actuator (not illustrated) to move first lens group G1, second lens group G2, third lens group G3, and fourth lens group G4 via the lens frame.

As described above, interchangeable lens device 201 in the exemplary embodiment includes zoom lens system 202 in one of the first to third exemplary embodiments.

This can achieve a compact interchangeable lens device with good image-forming performance at low cost. Entire camera system 100 can also be downsized and cost reduction is also achieved.

Other Exemplary Embodiments

The first to fourth exemplary embodiments are described above to exemplify the technology disclosed in the present disclosure. The technology of the present disclosure, however, is not limited to these embodiments, but is applicable to other embodiments appropriately devised through modification, substitution, addition, and omission, and so on. Accordingly, other exemplary embodiments are exemplified below.

The zoom lens systems in the first to third exemplary embodiments are applicable to imaging apparatuses, such as compact digital cameras and digital video cameras by removing camera mount 104 and lens mount 204 from lens interchangeable digital camera system 100 in the fourth exemplary embodiment and integrating camera body 101 and interchangeable lens device 201. In this case, an image can be displayed on monitor 103 or an image signal can be recorded in a memory (not illustrated) using the image signal converted by imaging element 102.

The zoom lens systems in the first to third exemplary embodiments do not necessarily use the entire zooming range. More specifically, a zoom lens system with lower magnification than that of the zoom lens systems described in numerical practical examples 1 to 3 described later may be used by segmenting a range assuring optical performance according to a required zooming range.

The zoom lens systems in the first to third exemplary embodiments correct image blurring by moving the lens element for correcting image blurring perpendicular to the optical axis. However, if the lens element is moved so as to have a vertical component, image blurring can be corrected. For example, if the lens barrel configuration is allowed to be more complicated, image blurring may be corrected by rotating the lens element for correcting image blurring such that its rotation center is on the optical axis.

Each lens group configuring each zoom lens system in the first to third exemplary embodiments is configured only with refractive lens elements that deflect incident rays by refraction (i.e., a lens element in which deflection takes place at a boundary face of media with different refractive indexes). However, the configuration is not limited. For example, each lens group may be configured with a diffractive lens element that deflects incident rays by diffraction, a hybrid lens element of diffraction and refraction that deflects incident rays by combination of diffraction and refraction actions, and a distributed index lens element that deflects incident rays by distributed index in medium. In particular, forming of a diffraction structure at a boundary face of media with different refractive indexes in the hybrid lens element of refraction and diffraction is preferable because wavelength dependency of diffraction efficiency can be improved.

Numerical Practical Examples

Numerical practical examples of zoom lens systems 202A to 202C in the first to third exemplary embodiments are given below. In all numerical practical examples, the unit of lengths is mm, and the unit of view angles is ° in all the tables. In the numerical practical examples, r is a curvature radius; d, a surface distance; nd, a refractive index for d-line; and vd, an Abbe number for d-line. In the practical examples, a surface with an * mark is aspheric and its aspheric shape is defined by the following expression.

$$Z = \frac{h^2/r}{1+\sqrt{1-(1+\kappa)(h/r)^2}} + \sum A_n h^n \quad \text{[Expression 1]}$$

Figure 2:
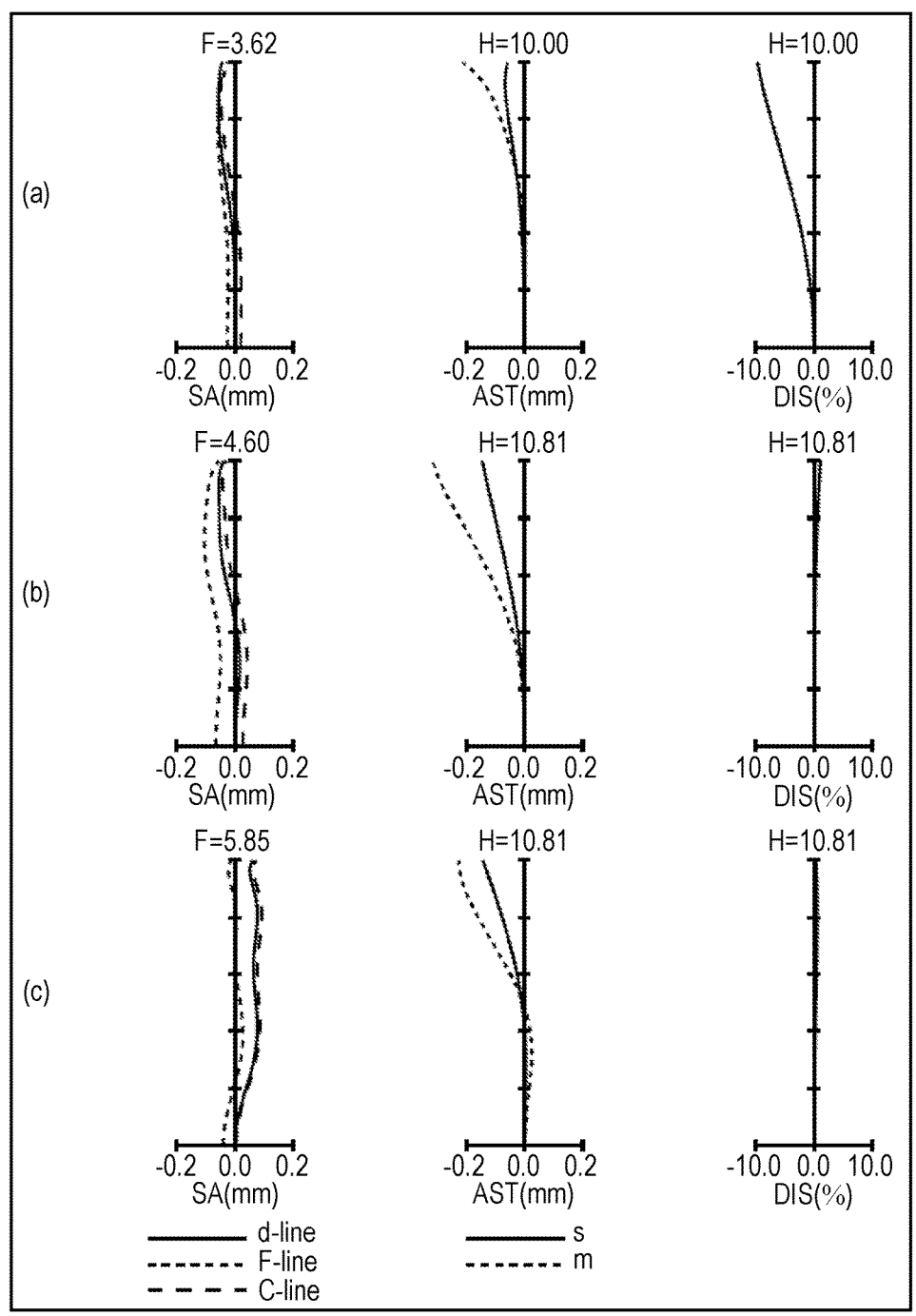
FIG. 2 is a longitudinal aberration diagram of the zoom lens system in the infinity focusing state in accordance with numerical practical example 1.
Figure 6:
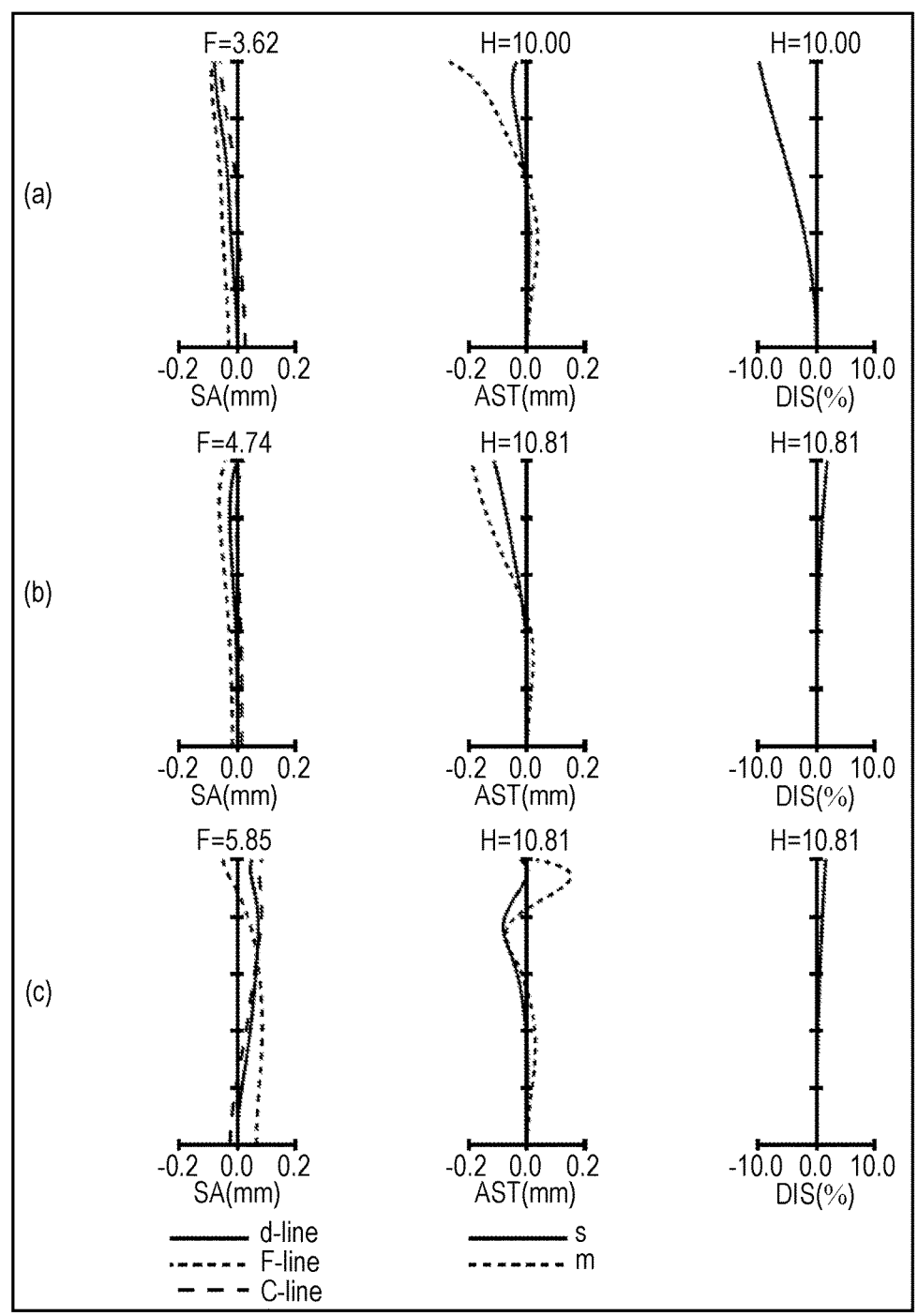
FIG. 6 is a longitudinal aberration diagram of the zoom lens system in the infinity focusing state in accordance with numerical practical example 2.
Figure 10:
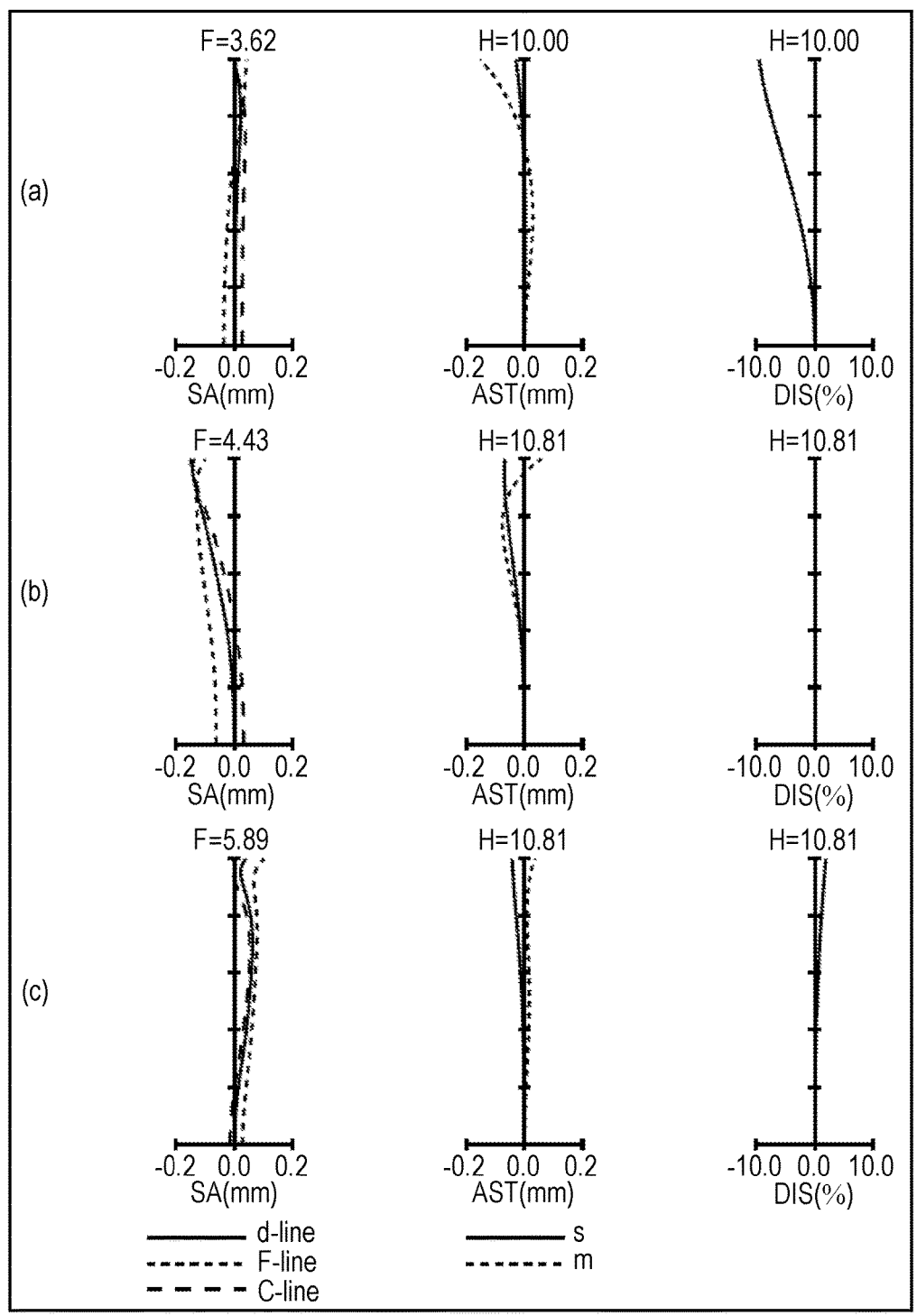
FIG. 10 is a longitudinal aberration diagram of the zoom lens system in the infinity focusing state in accordance with numerical practical example 3.

Where
Z: Distance from a point on an aspheric surface with height h from the optical axis to the tangent plane at the apex of the aspheric surface
h: Height from the optical axis
r: Curvature radius at the apex
κ: Conic constant
An: n-degree aspherical coefficient FIGS. 2, 6, and 10 are longitudinal aberration diagrams of the zoom lens systems in the infinity focusing state in accordance with numerical practical examples 1 to 3.

Figure 3:
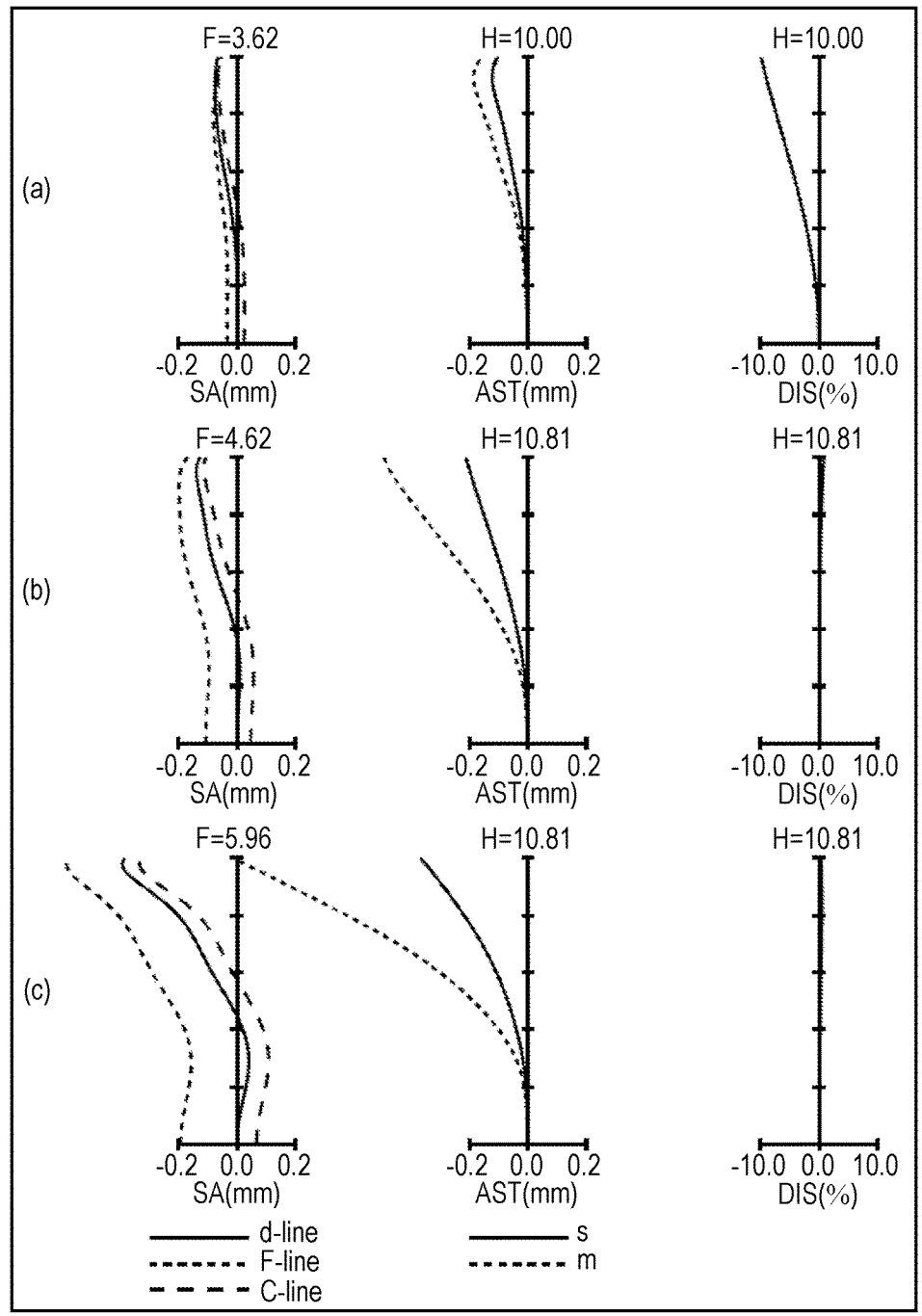
FIG. 3 is a longitudinal aberration diagram of the zoom lens system in a proximity focusing state in accordance with numerical practical example 1.
Figure 7:
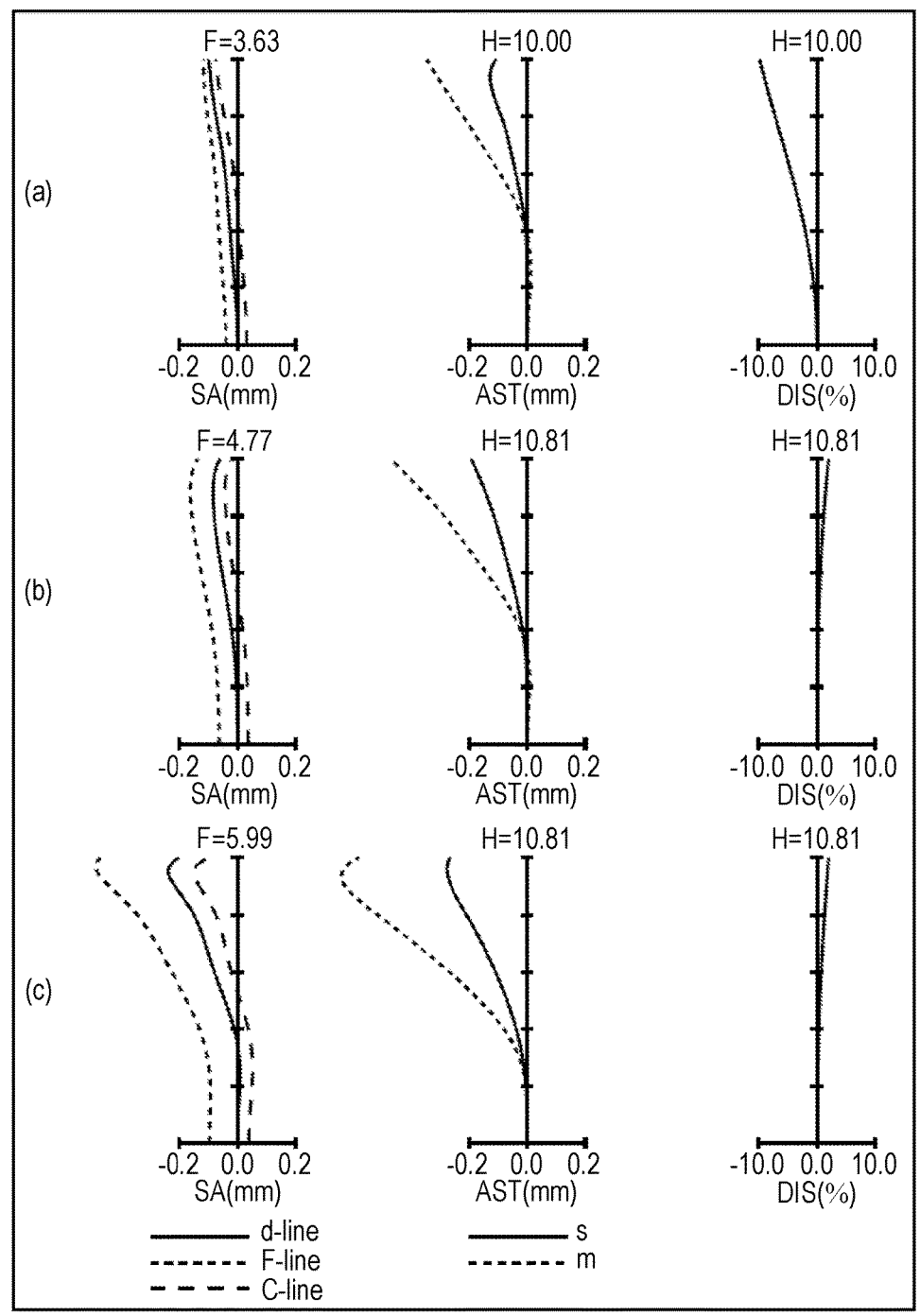
FIG. 7 is a longitudinal aberration diagram of the zoom lens system in a proximity focusing state in accordance with numerical practical example 2.
Figure 11:
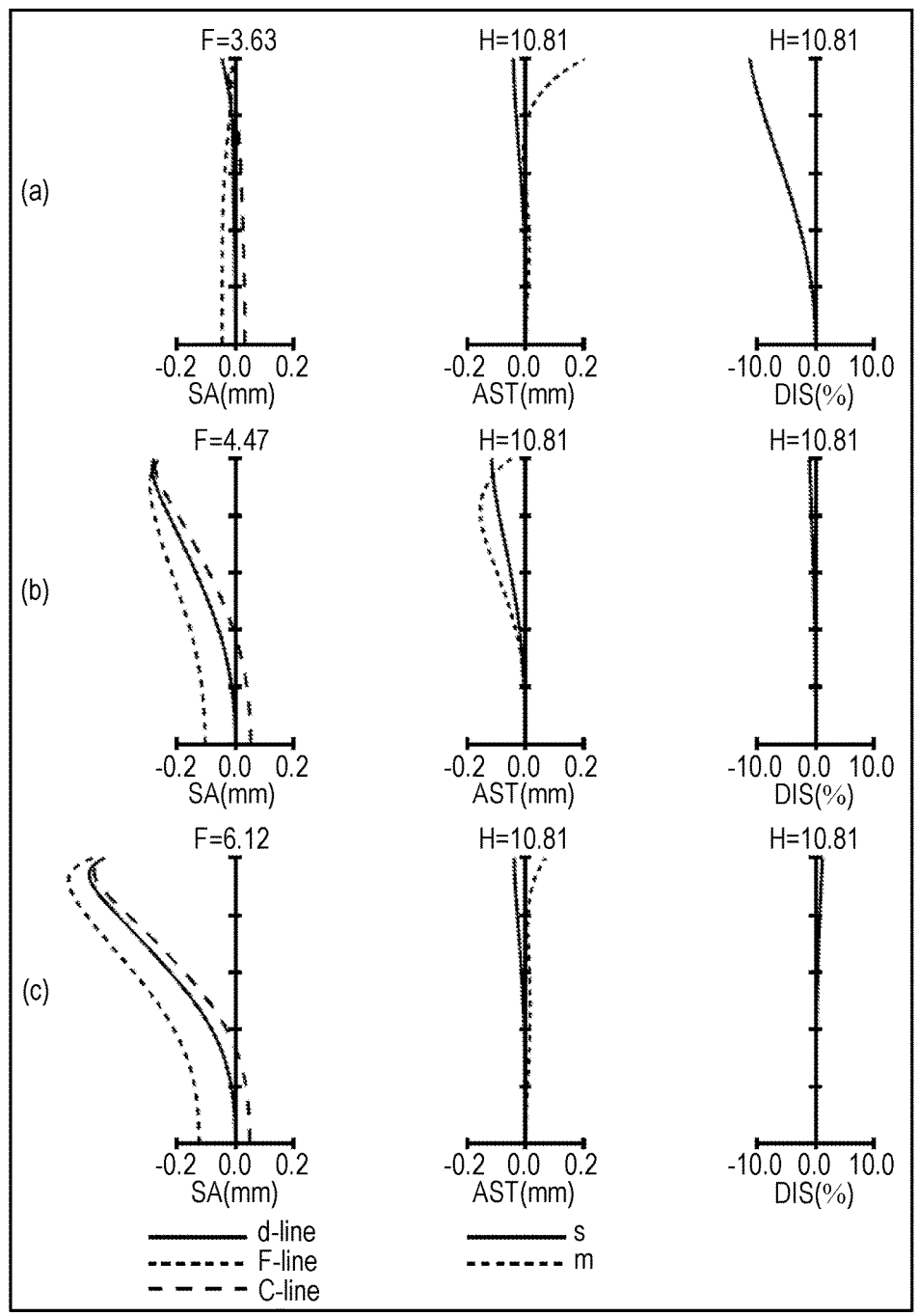
FIG. 11 is a longitudinal aberration diagram of the zoom lens system in a proximity focusing state in accordance with numerical practical example 3.

FIGS. 3, 7, and 11 are longitudinal aberration diagrams of the zoom lens systems in the proximity focusing state in accordance with numerical practical examples 1 to 3. An object distance in numerical practical examples 1 to 3 is 250 mm.

In each longitudinal aberration diagram, part (a) shows aberration at the wide-angle end; part (b), at an intermediate position; and part (c), at the telephoto end. Each longitudinal aberration diagram shows spherical aberration (SA (mm)), astigmatism (AST (mm)), distortion aberration (DIS (%)), in order from the left. In a spherical aberration diagram, the vertical axis represents F number (shown by F in the diagram). A solid line represents the characteristics of d-line; a short broken line, of F-line; and a long broken line, of C-line. In an astigmatism diagram, the vertical axis represents the image height (shown by H in the diagram). A solid line represents the characteristics of the sagittal plane (shown by s in the diagram); and a broken line, of the meridional plane (shown by m in the diagram). In a distortion aberration diagram, the vertical axis represents the image height (shown by H in the diagram).

Figure 4:
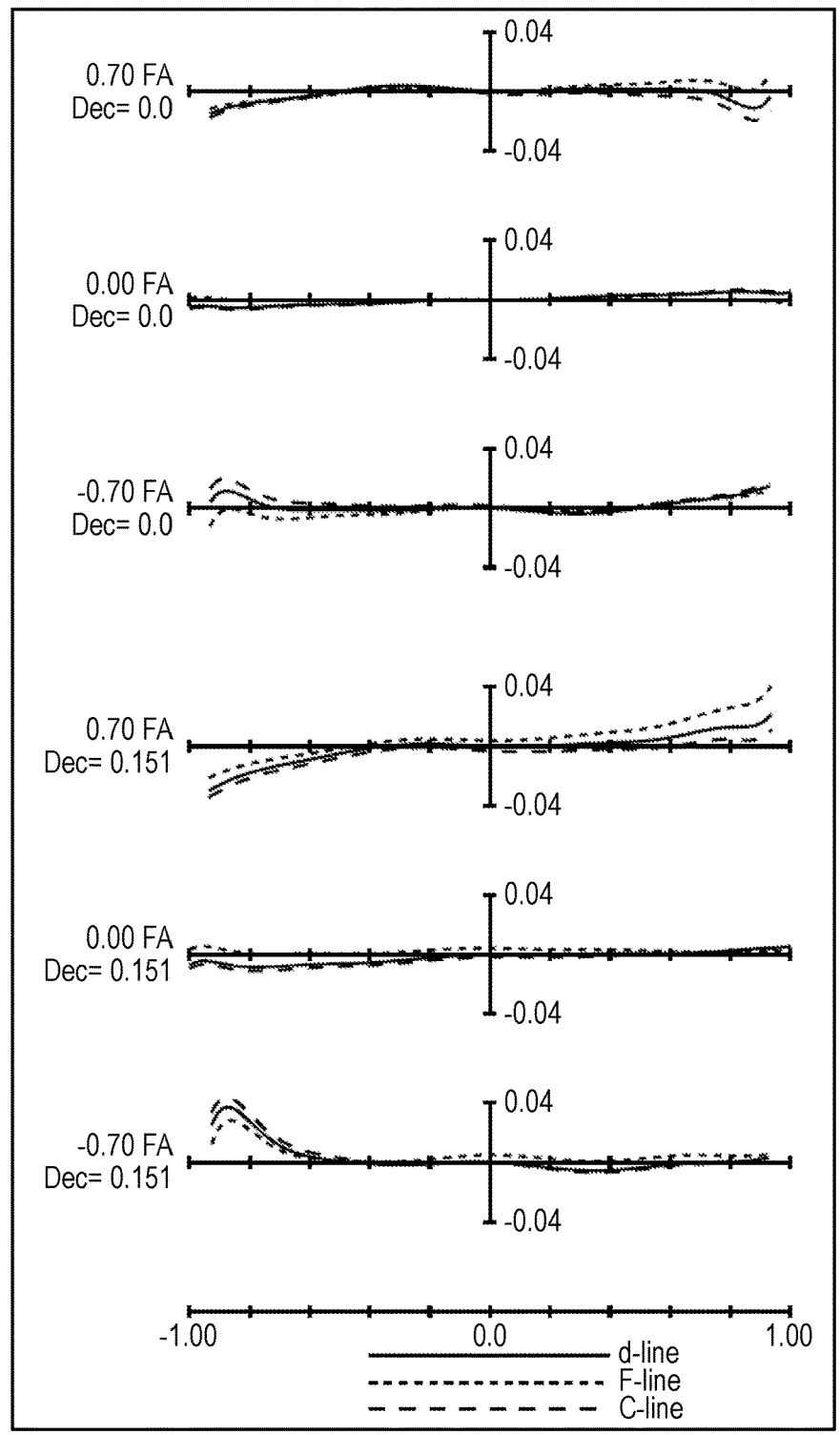
FIG. 4 is a lateral aberration diagram at a telephoto end of the zoom lens system in accordance with numerical practical example 1.
Figure 8:
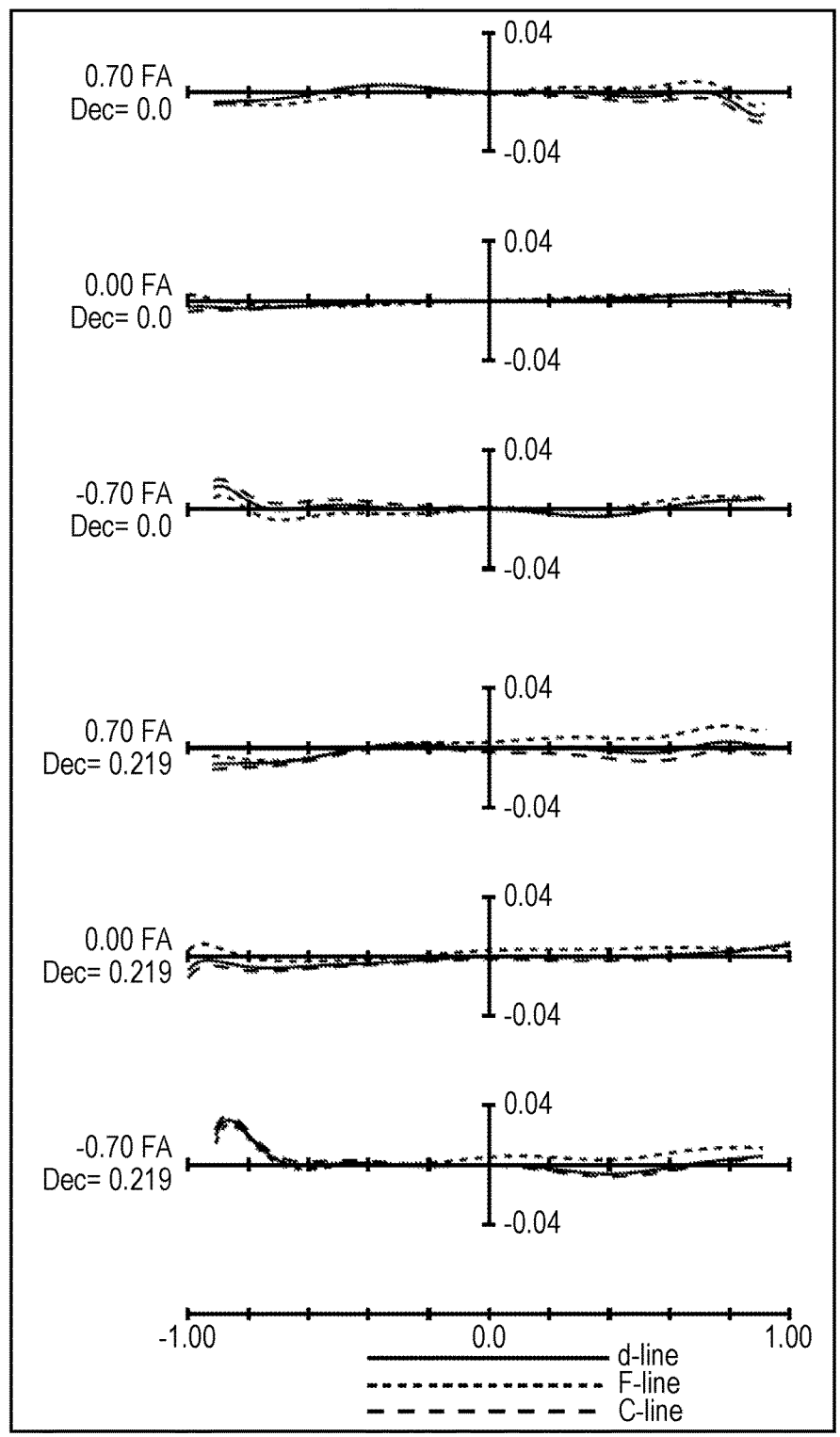
FIG. 8 is a lateral aberration diagram at a telephoto end of the zoom lens system in accordance with numerical practical example 2.
Figure 12:
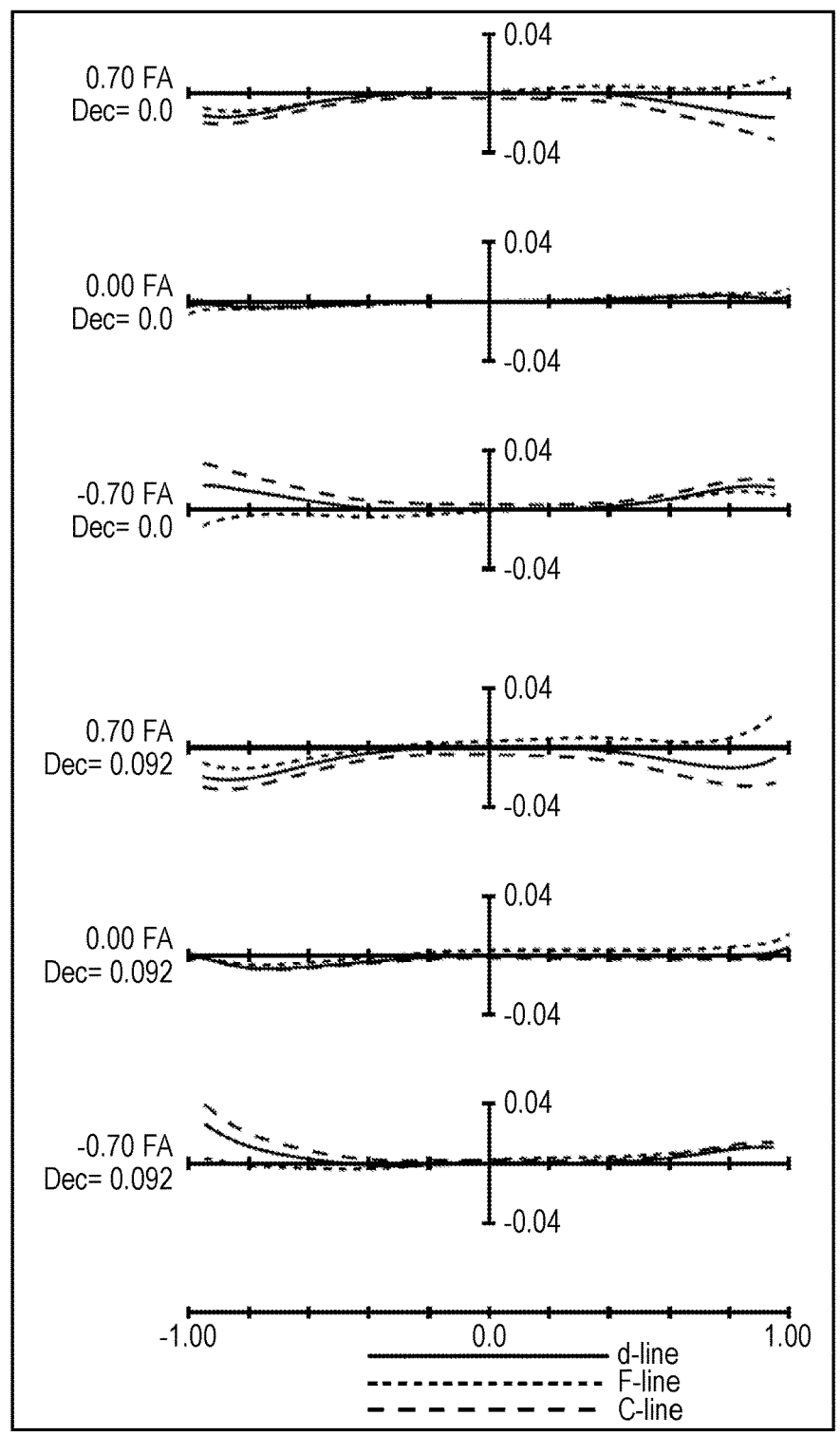
FIG. 12 is a lateral aberration diagram at a telephoto end of the zoom lens system in accordance with numerical practical example 3.

FIGS. 4, 8, and 12 are lateral aberration diagrams of the zoom lens systems at the telephoto end in accordance with numerical practical examples 1 to 3. In each lateral aberration diagram, the upper three aberration diagrams correspond to a basic state, where image blurring at the telephoto end is not corrected. The lower three aberration diagrams correspond to a state that image blurring is corrected at the telephoto end by moving lens element L3b (Numerical practical examples 1 to 3: Seventh lens element L7) perpendicular to the optical axis for a given amount.

In three lateral aberration diagrams in the basic state, the top corresponds to lateral aberration at an image point of 70% of the maximum image height; the middle, to lateral aberration at an image point on the axis; and the bottom, to lateral aberration at an image point of −70% of the maximum image height. In three lateral aberration diagrams in the state image blurring is corrected, the top corresponds to lateral aberration at an image point of 70% of the maximum image height; the middle, to lateral aberration at an image point on the axis; and the bottom, to lateral aberration at an image point of −70% of the maximum image height. In each lateral aberration diagram, the horizontal axis represents the distance from the main light beam on the pupil surface. A solid line shows the characteristics of d-line; a short broken line, of F-line; and a long broken line, of C-line. In each lateral aberration diagram, a meridional plane is defined as a surface containing the optical axis of first lens group G1 and the optical axis of lens element L3b.

For the zoom lens system of each numerical practical example, a moving distance of lens element L3b in a direction perpendicular to the optical axis at the telephoto end in the state image blurring is corrected is shown below.

| Numerical practical example 1 | 0.151 mm |
| Numerical practical example 2 | 0.219 mm |
| Numerical practical example 3 | 0.092 mm |

At the telephoto end with a photographing distance of infinity, the image eccentricity in a case when a zoom lens system is inclined by 0.3° is equal to the image eccentricity when lens element L3b moves in parallel for each of the above values in a direction perpendicular to the optical axis.

As is obvious from each lateral aberration diagram, lateral aberration at an image point on the axis has favorable symmetry. Comparison of lateral aberration between at +70% image point and at −70% image point in the basic state shows that both have a small curve degree and an approximately equivalent gradient in the aberration curve, and thus eccentric coma aberration and eccentric astigmatism prove to be small. This means sufficient image-forming performance is achieved even in the state image blurring is corrected. When zoom lens systems have the same image blur correction angle, a shorter focal length of the entire zoom lens system leads to a smaller distance of parallel movement required for blur correction. Accordingly, sufficient image blur correction can be performed without deteriorating the image-forming characteristic at image blur correction angles up to 0.3° at any zoom position.

Numerical Practical Example 1

The zoom lens system of numerical practical example 1 corresponds to the first exemplary embodiment shown in FIG. 1. Table 1 shows surface data and Table 2 shows aspheric data of the zoom lens system in numerical practical example 1. Tables 3A to 3D show various data in the infinity focusing state, and FIG. 4 shows various data in the proximity focusing state.

(Surface Data)

TABLE 1

| Surface No. | r | d | nd | vd |
|---|---|---|---|---|
| Object surface | ∞ | | | |
| 1 | 36.97160 | 1.25000 | 1.80610 | 33.3 |
| 2 | 26.95740 | 8.39220 | 1.51680 | 64.2 |
| 3 | 290.29790 | variable | | |
| 4 | 66.33400 | 1.10000 | 1.90366 | 31.3 |
| 5 | 11.97660 | 5.13980 | | |
| 6 | −74.92920 | 0.80000 | 1.72916 | 54.7 |
| 7 | 23.75980 | 2.21880 | | |
| 8 | 23.10700 | 2.21040 | 1.94595 | 18.0 |
| 9 | 86.88520 | variable | | |
| 10 (aperture) | ∞ | 1.00000 | | |
| 11* | 24.20910 | 1.56390 | 1.58699 | 59.5 |
| 12 | −108.29620 | 5.96800 | | |
| 13* | 22.04630 | 2.05940 | 1.53380 | 55.6 |
| 14* | −47.04370 | 1.00000 | | |
| 15 | 1783.13860 | 0.60000 | 1.80610 | 33.3 |
| 16 | 9.63770 | 3.56050 | 1.59282 | 68.6 |
| 17 | −18.96300 | variable | | |
| 18 | −184.79270 | 0.60000 | 1.59282 | 68.6 |
| 19 | 14.42290 | variable | | |
| 20* | −29.37180 | 1.50000 | 1.53380 | 55.6 |
| 21* | −26.27890 | 0.25000 | | |

TABLE 1-continued

| Surface No. | r | d | nd | vd |
|---|---|---|---|---|
| 22 | 274.98440 | 2.26530 | 1.58110 | 61.8 |
| 23 | −59.27630 | BF | | |
| Image surface | ∞ | | | |

(Aspheric Surface Data)

Eleventh surface

K = 0.00000E+00, A4 = −2.79478E−05, A6 = −7.73874E−07,
A8 = 3.47864E−08, A10 = −8.32552E−10, A12 = 7.96233E−12
Thirteenth surface K = 0.00000E+00, A4 = −3.73188E−05, A6 = 2.62144E−06,
A8 = −1.76305E−07, A10 = 4.59616E−09, A12 = −8.03868E−11
Fourteenth surface K = 0.00000E+00, A4 = 2.20394E−05, A6 = 7.52495E−07,
A8 = −7.07784E−08, A10 = 9.81716E−10, A12 = −3.39200E−11
Twentieth surface K = 0.00000E+00, A4 = −4.40472E−05, A6 = 7.16309E−07,
A8 = −5.51273E−09, A10 = 0.00000E+00, A12 = 0.00000E+00
Twenty-first surface K = 0.00000E+00, A4 = −4.42085E−05, A6 = 5.26469E−07,
A8 = −3.83691E−09, A10 = −3.92159E−12, A12 = 0.00000E+00

(Various Data in Infinity Focusing State)

TABLE 3A

| | Wide-angle end | Intermediate position | Telephoto end |
|---|---|---|---|
| Focal length | 12.2271 | 25.2823 | 50.9694 |
| Zoom ratio | 1.00000 | 2.06773 | 4.16856 |
| F number | 3.62315 | 4.61723 | 5.96246 |
| View angle | 41.6844 | 21.7706 | 10.4088 |
| Image height | 10.0000 | 10.8150 | 10.8150 |
| Total lens length | 90.5767 | 92.6438 | 125.2045 |
| BF | 14.08698 | 14.08713 | 14.08741 |
| d0 | 159.4235 | 157.3566 | 124.7962 |
| d3 | 0.5000 | 10.6762 | 35.7766 |
| d9 | 25.4195 | 7.7700 | 3.0194 |
| d17 | 3.4558 | 7.0157 | 8.5040 |
| d19 | 5.6361 | 11.6165 | 22.3388 |
| Entrance pupil position | 21.8781 | 34.7968 | 98.2406 |
| Exit pupil position | −29.6416 | −45.8358 | −88.1272 |
| Front principal point | 30.6193 | 48.7434 | 119.9574 |
| Rear principal point | 77.5088 | 63.8266 | 60.8291 |

TABLE 3B

Data of Single Lens

| Lens element | First surface | Focal length |
|---|---|---|
| L1 | 1 | −130.7484 |
| L2 | 2 | 56.8844 |
| L3 | 4 | −16.3305 |
| L4 | 6 | −24.6559 |
| L5 | 8 | 32.7262 |
| L6 | 11 | 33.8556 |
| L7 | 13 | 28.4165 |
| L8 | 15 | −12.0228 |
| L9 | 16 | 11.3027 |
| L10 | 18 | −22.5425 |
| L11 | 20 | 399.9986 |
| L12 | 22 | 84.1270 |

TABLE 3C

Data of Zoom Lens Groups

| Lens group | First surface | Focal length | Lens configuration length | Front principal point | Rear principal point |
|---|---|---|---|---|---|
| G1 | 1 | 104.26840 | 9.64220 | −1.93756 | 1.58826 |
| G2 | 4 | −14.76029 | 11.46900 | 0.44641 | 1.83058 |
| G3 | 10 | 16.51695 | 15.75180 | 7.86144 | 8.51303 |
| G4 | 18 | −22.54248 | 0.60000 | 0.34903 | 0.57276 |
| G5 | 20 | 68.70242 | 4.01530 | 3.30934 | 4.73578 |

TABLE 3D

Magnification of Zoom Lens Groups

| Lens group | First surface | Wide-angle end | Intermediate position | Telephoto end |
|---|---|---|---|---|
| G1 | 1 | −1.95929 | −2.03846 | −5.60877 |
| G2 | 4 | −0.05183 | −0.05218 | −0.02343 |
| G3 | 10 | −0.39394 | −0.68018 | −0.86438 |
| G4 | 18 | 2.13421 | 2.39951 | 2.87518 |
| G5 | 20 | 0.80544 | 0.80544 | 0.80544 |

(Various Data in Proximity Focusing State)

TABLE 4

| | Wide-angle end | Intermediate position | Telephoto end |
|---|---|---|---|
| Object distance | 250.0000 | 250.0000 | 250.0000 |
| BF | 14.0872 | 14.0872 | 14.0872 |
| d0 | 159.4235 | 157.3566 | 124.7962 |
| d3 | 0.5000 | 10.6762 | 35.7766 |
| d9 | 25.4195 | 7.7700 | 3.0194 |
| d17 | 3.4558 | 7.0157 | 8.5040 |
| d19 | 5.6361 | 11.6165 | 22.3388 |

Numerical Practical Example 2

The zoom lens system of numerical practical example 2 corresponds to the second exemplary embodiment shown in FIG. 5. Table 5 shows surface data and Table 6 shows aspheric data of the zoom lens system in numerical practical example 2. Tables 7A to 7D show various data in the infinity focusing state, and FIG. 8 shows various data in the proximity focusing state.
(Surface Data)

TABLE 5

| Surface No. | r | d | nd | vd |
|---|---|---|---|---|
| Object surface | ∞ | | | |
| 1 | 36.94390 | 1.20000 | 1.80610 | 33.3 |
| 2 | 26.91800 | 8.00000 | 1.51680 | 64.2 |
| 3 | 268.07570 | variable | | |
| 4 | 74.56100 | 1.10000 | 1.90366 | 31.3 |
| 5 | 11.90000 | 5.74130 | | |
| 6 | −55.59300 | 0.80000 | 1.62041 | 60.3 |
| 7 | 27.72800 | 1.79270 | | |
| 8 | 22.82400 | 2.10000 | 1.94595 | 18.0 |
| 9 | 66.83300 | variable | | |
| 10 (aperture) | ∞ | 1.00000 | | |
| 11* | 24.85900 | 2.50000 | 1.58699 | 59.5 |
| 12 | −37.13500 | 5.88930 | | |
| 13* | 26.54100 | 1.66000 | 1.53380 | 55.6 |
| 14* | −95.25290 | 1.00000 | | |
| 15 | 117.85160 | 0.60000 | 1.73800 | 32.3 |

TABLE 5-continued

| Surface No. | r | d | nd | vd |
|---|---|---|---|---|
| 16 | 9.79100 | 3.25000 | 1.49700 | 81.6 |
| 17 | −18.06070 | variable | | |
| 18* | −215.46000 | 1.21430 | 1.53380 | 55.6 |
| 19* | 11.62300 | variable | | |
| 20 | −1000.00000 | 4.04450 | 1.51742 | 52.1 |
| 21 | −25.00790 | BF | | |
| Image surface | ∞ | | | |

(Aspheric Surface Data)

TABLE 6

Eleventh surface

K = 0.00000E+00, A4 = −3.55220E−05, A6 = −1.08362E−06,
A8 = 5.77171E−08, A10 = −1.67254E−09, A12 = 1.90130E−11
Thirteenth surface K = 0.00000E+00, A4 = −5.32137E−06, A6 = −5.66960E−07,
A8 = 5.95887E−08, A10 = 2.28840E−10, A12 = −3.91081E−11
Fourteenth K = 0.00000E+00, A4 = 3.67775E−05, A6 = −3.06523E−06,
A8 = 2.38448E−07, A10 = −5.97129E−09, A12 = 3.84009E−11
Eighteenth surface K = 0.00000E+00, A4 = −2.15771E−04, A6 = 5.28419E−06,
A8 = −5.21315E−08, A10 = 5.99872E−10, A12 = −2.83037E−11
Nineteenth surface K = 0.00000E+00, A4 = −2.46865E−04, A6 = 3.87923E−06,
A8 = 2.22954E−08, A10 = −3.01584E−09, A12 = 3.30166E−11

(Various Data in Infinity Focusing State)

TABLE 7A

| | Wide-angle end | Intermediate position | Telephoto end |
|---|---|---|---|
| Focal length | 12.4644 | 26.8412 | 57.7842 |
| Zoom ratio | 1.00000 | 2.15343 | 4.63594 |
| F number | 3.62207 | 4.74375 | 5.84637 |
| View angle | 41.6837 | 21.5822 | 10.4396 |
| Image height | 10.0000 | 10.8150 | 10.8150 |
| Total lens length | 90.5862 | 89.8859 | 123.4402 |
| BF | 14.23627 | 14.23646 | 14.23623 |
| d3 | 0.7565 | 7.6661 | 35.5513 |
| d9 | 26.1000 | 7.6930 | 2.7090 |
| d17 | 1.8729 | 5.2170 | 5.6168 |
| d19 | 5.7284 | 13.1812 | 23.4348 |
| Entrance pupil position | 22.0700 | 29.0228 | 94.8926 |
| Exit pupil position | −31.7182 | −61.8336 | −160.4852 |
| Front principal point | 31.1536 | 46.3931 | 133.5663 |
| Rear principal point | 78.1217 | 63.0447 | 65.6561 |

TABLE 7B

Data of Single Lens

| Lens element | First surface | Focal length |
|---|---|---|
| L1 | 1 | −129.9919 |
| L2 | 2 | 57.2528 |
| L3 | 4 | −15.8012 |
| L4 | 6 | −29.7107 |
| L5 | 8 | 35.8110 |
| L6 | 11 | 25.7523 |
| L7 | 13 | 39.0710 |
| L8 | 15 | −14.5032 |
| L9 | 16 | 13.2897 |

TABLE 7B-continued

Data of Single Lens

| Lens element | First surface | Focal length |
|---|---|---|
| L10 | 18 | −20.6211 |
| L11 | 20 | 49.5016 |

TABLE 7C

Data of Zoom Lens Groups

| Lens group | First surface | Focal length | Lens configuration length | Front principal point | Rear principal point |
|---|---|---|---|---|---|
| G1 | 1 | 105.90789 | 9.20000 | −1.97646 | 1.39289 |
| G2 | 4 | −14.95507 | 11.53400 | 0.49766 | 1.98167 |
| G3 | 10 | 16.60754 | 15.89930 | 6.94943 | 7.53759 |
| G4 | 18 | −20.62114 | 1.21430 | 0.74978 | 1.17385 |
| G5 | 20 | 49.50158 | 4.04450 | 2.72988 | 4.11277 |

TABLE 7D

Magnification of Zoom Lens Groups

| Lens group | First surface | Wide-angle end | Intermediate position | Telephoto end |
|---|---|---|---|---|
| G1 | 1 | 0.00000 | 0.00000 | 0.00000 |
| G2 | 4 | −0.18262 | −0.19945 | −0.31754 |
| G3 | 10 | −0.38021 | −0.65064 | −0.74450 |
| G4 | 18 | 2.37470 | 2.73613 | 3.23335 |
| G5 | 20 | 0.71379 | 0.71378 | 0.71379 |

(Various Data in Proximity Focusing State)

| | Wide-angel end | Intermediate position | Telephoto end |
|---|---|---|---|
| Object distance | 250.0000 | 250.0000 | 250.0000 |
| BF | 14.2364 | 14.2364 | 14.2364 |
| d0 | 159.4138 | 160.1141 | 126.5596 |
| d3 | 0.7565 | 7.6661 | 35.5513 |
| d9 | 26.1000 | 7.6930 | 2.7090 |
| d17 | 2.2388 | 6.4036 | 8.9986 |
| d19 | 5.3625 | 11.9947 | 20.0529 |

Numerical Practical Example 3

The zoom lens system of numerical practical example 3 corresponds to the third exemplary embodiment shown in FIG. 9. Table 9 shows surface data and Table 10 shows aspheric data of the zoom lens system in numerical practical example 3. Tables 11A to 11D show various data in the infinity focusing state, and FIG. 12 shows various data in the proximity focusing state.

(Surface Data)

TABLE 9

| Surface No. | r | d | nd | vd |
|---|---|---|---|---|
| Object surface | ∞ | | | |
| 1 | 43.21430 | 1.30000 | 1.84666 | 23.8 |
| 2 | 33.46700 | 5.67000 | 1.72916 | 54.7 |
| 3 | 130.54930 | variable | | |
| 4 | 35.17630 | 1.20000 | 2.00100 | 29.1 |

TABLE 9-continued

| Surface No. | r | d | nd | vd |
|---|---|---|---|---|
| 5 | 10.53820 | 6.34830 | | |
| 6 | −43.55120 | 0.80000 | 1.86839 | 41.6 |
| 7 | 28.45380 | 1.22020 | | |
| 8 | 24.95780 | 2.54080 | 1.94595 | 18.0 |
| 9 | −326.28340 | variable | | |
| 10 (aperture) | ∞ | 1.00000 | | |
| 11 | 16.17720 | 1.37540 | 1.88300 | 40.8 |
| 12 | 43.48720 | 3.86050 | | |
| 13* | 17.17340 | 2.36130 | 1.58844 | 61.0 |
| 14* | −22.24640 | 1.00000 | | |
| 15 | −17.10850 | 0.60000 | 1.76539 | 35.8 |
| 16 | 9.56930 | 3.85000 | 1.49700 | 81.6 |
| 17 | −11.68770 | variable | | |
| 18* | −164.38250 | 0.60000 | 1.80998 | 40.9 |
| 19* | 22.06930 | variable | | |
| 20 | 31.92420 | 2.08360 | 1.94575 | 24.9 |
| 21 | 77.36160 | BF | | |
| Image surface | ∞ | | | |

(Aspheric Surface Data)

TABLE 10

Thirteenth surface $K = 0.00000E+00, A4 = 2.48726E-07, A6 = 3.38179E-08,$
$A8 = -4.40494E-09, A10 = 9.51022E-10$
Fourteenth surface $K = 0.00000E+00, A4 = 1.29077E-04, A6 = -1.05779E-06,$
$A8 = 2.35430E-08, A10 = 4.65467E-10$
Eighteenth surface $K = 0.00000E+00, A4 = -2.48038E-04, A6 = 7.62363E-06,$
$A8 = -4.66573E-08, A10 = 1.36557E-10$
Nineteenth surface $K = 0.00000E+00, A4 = -2.47448E-04, A6 = 7.70980E-06,$
$A8 = -6.98891E-08, A10 = 3.63326E-10$ (Various Data in Infinity Focusing State)

TABLE 11A

| | Wide-angle end | Intermediate position | Telephoto end |
|---|---|---|---|
| Focal length | 12.4206 | 26.8532 | 58.2162 |
| Zoom ratio | 1.00000 | 2.16199 | 4.68707 |
| F number | 3.62265 | 4.42664 | 5.88582 |
| View angle | 41.6785 | 21.9191 | 10.3335 |
| Image height | 10.0000 | 10.8150 | 10.8150 |
| Total lens length | 87.1606 | 93.2012 | 119.0522 |
| BF | 14.93614 | 14.93594 | 14.93556 |
| d3 | 0.7000 | 15.3735 | 32.4832 |
| d9 | 25.5976 | 9.6580 | 3.7652 |
| d17 | 2.4995 | 6.1298 | 6.5344 |
| d19 | 7.6173 | 11.2939 | 25.5237 |
| Entrance pupil position | 19.4499 | 43.0704 | 90.8684 |
| Exit pupil position | −26.4073 | −37.6670 | −103.7999 |
| Front principal point | 28.1390 | 56.2154 | 120.5411 |
| Rear principal point | 74.7400 | 66.3481 | 60.8359 |

TABLE 11B

Data of Single Lens

| Lens element | First surface | Focal length |
|---|---|---|
| L1 | 1 | −186.6603 |
| L2 | 2 | 60.2368 |
| L3 | 4 | −15.4059 |
| L4 | 6 | −19.7163 |

TABLE 11B-continued

Data of Single Lens

| Lens element | First surface | Focal length |
|---|---|---|
| L5 | 8 | 24.5957 |
| L6 | 11 | 28.5000 |
| L7 | 13 | 16.8441 |
| L8 | 15 | −7.9405 |
| L9 | 16 | 11.2638 |
| L10 | 18 | −23.9872 |
| L11 | 20 | 56.2187 |

TABLE 11C

Data of Zoom Lens Groups

| Lens group | First surface | Focal length | Lens configuration length | Front principal point | Rear principal point |
|---|---|---|---|---|---|
| G1 | 1 | 91.60254 | 6.97000 | −2.26839 | 0.86175 |
| G2 | 4 | −14.10605 | 12.10930 | 0.65476 | 2.23114 |
| G3 | 10 | 16.98978 | 14.04720 | 5.00599 | 6.17997 |
| G4 | 18 | −23.98716 | 0.60000 | 0.29184 | 0.56082 |
| G5 | 20 | 56.21873 | 2.08360 | −0.73597 | 0.30013 |

TABLE 11D

Magnification of Zoom Lens Groups

| Lens group | First surface | Wide-angle end | Intermediate position | Telephoto end |
|---|---|---|---|---|
| G1 | 1 | 0.00000 | 0.00000 | 0.00000 |
| G2 | 4 | −0.20142 | −0.25481 | −0.36878 |
| G3 | 10 | −0.42013 | −0.67279 | −0.81028 |
| G4 | 18 | 2.28058 | 2.43383 | 3.02703 |
| G5 | 20 | 0.70260 | 0.70260 | 0.70261 |

(Various Data in Proximity Focusing State)

TABLE 12

| | Wide-angle end | Intermediate position | Telephoto end |
|---|---|---|---|
| Object distance | 250.0000 | 250.0000 | 250.0000 |
| BF | 14.9358 | 14.9358 | 14.9358 |
| d0 | 162.8393 | 156.7984 | 130.9471 |
| d3 | 0.7000 | 15.3735 | 32.4832 |
| d9 | 25.5976 | 9.6580 | 3.7652 |
| d17 | 2.9127 | 7.6762 | 10.7291 |
| d19 | 7.2041 | 9.7476 | 21.3290 |

Corresponding Values of Conditions

Table 13 below shows corresponding values of each condition for the zoom lens system in each numerical practical example.

TABLE 13

| | | Numerical Practical Examples | | |
|---|---|---|---|---|
| Conditions | | 1 | 2 | 3 |
| (1) | fL3b/fG3 | 1.72 | 2.35 | 0.99 |
| (2) | D3Gmax/T3G | 0.40 | 0.40 | 0.30 |

INDUSTRIAL APPLICABILITY

A zoom lens system of the present disclosure is applicable typically to digital still cameras, digital video cameras, cameras of mobile phones, cameras of PDAs (Personal Digital Assistances), monitoring cameras in monitoring systems, web cameras, and vehicle-mounted cameras. In particular, the present disclosure is suitable for imaging optical systems that require high picture quality, such as digital still camera systems and digital video camera systems.

What is claimed is:

1. A zoom lens system, in order from an object side to an image side, comprising:
    a first lens group with positive optical power;
    a second lens group with negative optical power;
    a third lens group with positive optical power;
    a fourth lens group with negative optical power; and
    a fifth lens group with positive optical power,
    wherein
    an aperture stop is provided between the second lens group and the third lens group,
    the third lens group, in order from the object side to the image side, consists of:
        a lens L3$a$ with positive optical power;
        a lens L3$b$ with positive optical power;
        a lens L3$c$ with negative optical power; and
        a lens L3$d$ with positive optical power,
        wherein
        respective optical surfaces of the lens L3$c$ and the lens L3$d$ are mutually cemented, and
        the lens L3$b$ optically corrects image blurring by moving in a way so as to have a component perpendicular to an optical axis,
    the fourth lens group moves along the optical axis when focusing from an infinity focusing state to a proximity focusing state,
    when zooming from a wide-angle end to a telephoto end, at least:
        the first lens group,
        the second lens group,
        the third lens group, and
        the fourth lens group
    move in a direction along the optical axis such that a distance between respective lens groups changes in the direction along the optical axis, and
    condition (1) and condition (2a) below are satisfied:

$$0.24 < fL3b/fG3 < 3.0 \tag{1}$$

where
    fL3$b$ is a focal length of the lens L3$b$, and
    fG3 is a focal length of the third lens group,
    and $$0.23 < D3Gmax/T3G < 0.8 \tag{2a}$$

where
    D3G max is a maximum air space inside the third lens group, and
    T3G is a thickness of the third lens group on the optical axis.

2. The zoom lens system of claim 1, wherein the fifth lens group is fixed relative to an image surface when zooming from the wide-angle end to the telephoto end.

3. The zoom lens system of claim 1, wherein the first lens group is configured with two lenses.

4. The zoom lens system of claim 1, wherein the second lens group is configured with three lenses.

5. The zoom lens system of claim 1, wherein the fourth lens group is configured with one lens.

6. The zoom lens system of claim 1, wherein the lens L3$b$ is a resin lens and both surfaces of the resin lens are aspherical.

7. The zoom lens system of claim 1, wherein the fourth lens group includes at least one resin lens.

8. The zoom lens system of claim 1, wherein the aperture stop integrally moves with the third lens group when zooming from the wide-angle end to the telephoto end.

9. An interchangeable lens device detachable, via a camera mount of a camera body, from the camera body including an imaging element for receiving an optical image of an object and converting the optical image to an electric image signal, the interchangeable lens device comprising:
    a zoom lens system for forming the optical image of the object in the imaging element; and
    a lens mount at least electrically or mechanically connected to the camera mount,
    wherein
    the zoom lens system, in order from an object side to an image side, includes:
        a first lens group with positive optical power;
        a second lens group with negative optical power;
        a third lens group with positive optical power;
        a fourth lens group with negative optical power; and
        a fifth lens group with positive optical power,
        wherein
        an aperture stop is provided between the second lens group and the third lens group,
        the third lens group, in order from the object side to the image side, consists of:
            a lens L3$a$ with positive optical power;
            a lens L3$b$ with positive optical power;
            a lens L3$c$ with negative optical power; and
            a lens L3$d$ with positive optical power,
            wherein
            respective optical surfaces of the lens L3$c$ and the lens L3$d$ are mutually cemented, and
            the lens L3$b$ optically corrects image blurring by moving in a way so as to have a component perpendicular to an optical axis,
        the fourth lens group moves along the optical axis when focusing from an infinity focusing state to a proximity focusing state, and
        when zooming from a wide-angle end to a telephoto end, at least:
            the first lens group,
            the second lens group,
            the third lens group, and
            the fourth lens group
        move in a direction along the optical axis such that a distance between respective lens groups changes in the direction along the optical axis; and
        the zoom lens system satisfies condition (1) and condition (2a) below:

$$0.24 < fL3b/fG3 < 3.0 \tag{1}$$

where
        fL3$b$ is a focal length of the lens L3$b$, and
        fG3 is a focal length of the third lens group,
        and $$0.23 < D3Gmax/T3G < 0.8 \tag{2a}$$

where
        D3G max is a maximum air space inside the third lens group, and

T3G is a thickness of the third lens group on the optical axis.

10. A camera system comprising:
the interchangeable lens device of claim 9; and
the camera body.

11. An imaging apparatus for converting an optical image of an object to an electric image signal and at least one of displaying and storing a converted image signal, the imaging apparatus comprising:
- a zoom lens system for forming the optical image of the object; and
- an imaging element for converting the optical image formed by the zoom lens system to the electric image signal, wherein
the zoom lens system, in order from an object side to an image side, includes:
- a first lens group with positive optical power;
- a second lens group with negative optical power;
- a third lens group with positive optical power;
- a fourth lens group with negative optical power; and
- a fifth lens group with positive optical power, wherein
an aperture stop is provided between the second lens group and the third lens group,
the third lens group, in order from the object side to the image side, consists of:
- a lens L3$a$ with positive optical power;
- a lens L3$b$ with positive optical power;
- a lens L3$c$ with negative optical power; and
- a lens L3$d$ with positive optical power, wherein
respective optical surfaces of the lens L3$c$ and the lens L3$d$ are mutually cemented, and
the lens L3$b$ optically corrects image blurring by moving in a way so as to have a component perpendicular to an optical axis,
the fourth lens group moves along the optical axis when focusing from an infinity focusing state to a proximity focusing state, and
when zooming from a wide-angle end to a telephoto end, at least:
the first lens group,
the second lens group,
the third lens group, and
the fourth lens group
move in a direction along the optical axis such that a distance between respective lens groups changes in the direction along the optical axis; and
the zoom lens system satisfies condition (1) and condition (2a) below:

$$0.24 < fL3b/fG3 < 3.0 \tag{1}$$

where
f L3$b$ is a focal length of the lens L3$b$, and
fG3 is a focal length of the third lens group,
and $$0.23 < D3Gmax/T3G < 0.8 \tag{2a}$$

where
D3G max is a maximum air space inside the third lens group, and
T3G is a thickness of the third lens group on the optical axis.

* * * * *